US007010947B2

(12) United States Patent
Milo

(10) Patent No.: US 7,010,947 B2
(45) **Date of Patent: *Mar. 14, 2006**

(54) REMOTE DOOR ENTRY SYSTEM

(75) Inventor: Thomas K. Milo, Akron, OH (US)

(73) Assignee: T.K.M. Unlimited, Inc., Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/463,184

(22) Filed: Jun. 17, 2003

(65) Prior Publication Data

US 2003/0214384 A1 Nov. 20, 2003

Related U.S. Application Data

(63) Continuation-in-part of application No. 09/330,962, filed on Jun. 11, 1999, now Pat. No. 6,580,355.

(51) Int. Cl.
*B60R 25/04* (2006.01)

(52) U.S. Cl. ........................... 70/257; 70/277; 70/280; 340/5.7; 292/144

(58) Field of Classification Search .................. 70/277, 70/257, 278.1–278.3, 278.6, 280–283.1, 70/153, 157; 292/144, 216; 340/5.64, 5.7, 340/825.72, 546
See application file for complete search history.

(56) References Cited

U.S. PATENT DOCUMENTS 1,358,445 A * 11/1920 Hermanowich .............. 70/108
3,792,885 A * 2/1974 Giardina et al. .............. 292/39
3,933,382 A * 1/1976 Counts et al. .............. 292/144
3,947,060 A * 3/1976 Zimmer et al. ............. 292/142
4,270,694 A * 6/1981 Knauth ...................... 236/49.3
4,298,223 A * 11/1981 Raffelsiefer et al. ........ 292/216
4,324,425 A * 4/1982 Logan ........................ 292/201
4,568,998 A * 2/1986 Kristy ........................ 361/172
4,802,353 A * 2/1989 Corder et al. ................. 70/277
4,807,455 A * 2/1989 Mauer ......................... 70/277
4,833,465 A * 5/1989 Abend et al. ............. 340/5.65
4,840,050 A * 6/1989 Gotanda ...................... 70/107
4,854,143 A * 8/1989 Corder et al. ................. 70/218
4,927,196 A * 5/1990 Girard et al. ............... 292/201
4,929,003 A * 5/1990 McConnell ................. 292/144
4,956,588 A * 9/1990 Ming .......................... 318/16
5,035,450 A * 7/1991 Muller ........................ 292/92
5,474,342 A * 12/1995 Smith et al. ................ 292/254
5,566,991 A * 10/1996 Young ........................ 292/201
5,626,039 A * 5/1997 Solari et al. ............... 70/279.1
5,722,706 A * 3/1998 Bartel et al. ................ 292/216
5,790,034 A * 8/1998 Khoury ..................... 340/5.64
5,852,944 A * 12/1998 Collard et al. ............. 70/278.7
5,862,692 A * 1/1999 Legault et al. ............. 70/278.1
5,911,460 A * 6/1999 Hawkins et al. ............ 292/254
6,022,056 A * 2/2000 Cope et al. ................. 292/144

(Continued)

*Primary Examiner*—Suzanne Dino Barrett
(74) *Attorney, Agent, or Firm*—Fay, Sharpe, Fagan, Minnich & McKee, LLP

(57) ABSTRACT

A door entry system includes control means for controlling operation of the door entry system and a deadbolt assembly that is operable to selectively lock a door. The deadbolt assembly includes: a first bolt member movable between an extended and a retracted position; switch means arranged on said first bolt member, the switch means conveying a signal to the control means to move said first bolt member between the extended and retracted positions when the switch means is activated; and, driving means for selectively moving the first bolt member between the extended and retracted positions.

28 Claims, 27 Drawing Sheets

U.S. PATENT DOCUMENTS 6,441,735 B1 * 8/2002 Marko et al. ............... 340/542
6,471,265 B1 * 10/2002 Scott, Sr. ............... 292/341.15
6,568,726 B1 * 5/2003 Caspi et al. ........... 292/341.16
6,580,355 B1 * 6/2003 Milo .......................... 340/5.7
6,581,991 B1 * 6/2003 Galindo ................. 292/341.16
6,619,085 B1 * 9/2003 Hsieh .......................... 70/257
6,658,905 B1 * 12/2003 Hsieh ........................ 70/279.1

* cited by examiner

REMOTE DOOR ENTRY SYSTEM

The present application is a continuation-in-part application of U.S. patent application Ser. No. 09/330,962, filed Jun. 11, 1999, now U.S. Pat. No. 6,580,355.

FIELD OF INVENTION

The present invention generally relates to a door entry system, and more particularly to a door entry system capable of remote control operation.

BACKGROUND OF THE INVENTION

There is a need for reliable security in many places, including homes and offices. One of the most significant components of this security are door locks. Existing door lock systems which provide enhanced security to existing door latches and locks, and/or provide a system for remote control, have drawbacks which significantly affect their utility. In this regard, existing door lock systems are often designed in a manner which is incompatible with existing door latch and lock hardware, or requires significant modification to existing door latches and locks and/or the region surrounding the existing door latches and locks. Other drawbacks are the difficulties and complexities encountered to install prior art door lock systems. The present invention addresses these and other drawbacks to provide a remote door entry system which is versatile, convenient to use and install, and which is adapted for use in connection with existing door latch and door lock hardware.

SUMMARY OF THE INVENTION

In accordance with one aspect of the present invention, a door entry system includes control means for controlling operation of the door entry system and a deadbolt assembly that is operable to selectively lock a door. The deadbolt assembly includes: a first bolt member movable between an extended and a retracted position; switch means arranged on said first bolt member, the switch means conveying a signal to the control means to move said first bolt member between the extended and retracted positions when the switch means is activated; and, driving means for selectively moving the first bolt member between the extended and retracted positions.

In accordance with another aspect of the present invention, a door entry system includes a deadbolt assembly that is operable to selectively lock a door. The deadbolt assembly includes first and second members that are selectively engaged with and disengaged from one another such that when engaged they move in unison with one another and when disengaged they are independently movable with respect to one another. Drive means are coupled to the second member such that the first member is selectively movable by the drive means between extended and retracted positions when the first and second members are engaged with one another and the first member is not movable by the drive means between the extended and retracted positions when the first and second members are disengaged from one another. Control means are provided for controlling the drive means.

In accordance with still another aspect of the present invention, a door entry system includes: a deadbolt member movable between an extended and a retracted position; switch means arranged in or on the deadbolt member, the switch means generating a signal to effect movement of the deadbolt member to the extended or retracted position when the switch means is activated; motor means for moving the deadbolt member between the extended and retracted positions; a deadbolt bolt lever body housing means dimensioned to receive the deadbolt member when in its extended position, the deadbolt bolt lever body housing means including therein a second movable bolt section engagable with the switch means to activate the switch means.

In accordance with yet another aspect of the present invention, a door entry system includes: control means for controlling operation of the door entry system, a deadbolt assembly that is operable to selectively lock a door and a deadbolt receiving assembly arranged opposite the deadbolt assembly. The deadbolt assembly includes: a first bolt member movable between an extended position and a retracted position; trigger means for conveying a signal to the control means to move said first bolt member between the extended and retracted positions when said trigger means is triggered; and, driving means for selectively moving the first bolt member between the extended and retracted positions. The deadbolt receiving assembly includes: a receiving region that receives the first bolt member when the first bolt member is in the extended position thereby locking the door, the deadbolt receiving region not receiving the first bolt member when the first bolt member is in the retracted position thereby not locking the door; and, activation means for selectively triggering the trigger means.

An advantage of the present invention is the optional provision of a remote door entry system which has compact dimensions.

Another advantage of the present invention is the optional provision of a remote door entry system which may be conveniently located in an area having limited space.

Another advantage of the present invention is the optional provision of a remote door entry system that is concealed from view.

Another advantage of the present invention is the optional provision of a remote door entry system which may be electrically powered and which may still be unlocked even in the event of an electrical power failure or loss.

Still another advantage of the present invention is the optional provision of a remote door entry system that provides enhanced security.

Still another advantage of the present invention is the optional provision of a remote door entry system that is tamper resistant.

Still another advantage of the present invention is the optional provision of a remote door entry system which can be conveniently operated via a compact remote control unit.

Still another advantage of the present invention is the optional provision of a remote door entry system which may be operated in connection with an associated alarm system.

Still another advantage of the present invention is the optional provision of a remote door entry system which does not require internal or external wiring for providing power thereto.

Yet another advantage of the present invention is the optional provision of a remote door entry system which may be battery powered and/or hardwired.

Yet another advantage of the present invention is the optional provision of a remote door entry system which is adapted for use with existing spring latch bolt and/or dead latch bolt door handle assemblies.

Yet another advantage of the present invention is the optional provision of a remote door entry system which is conveniently configured with a add-on bolt arrangement, and/or add-on battery unit, or any combination thereof.

Yet another advantage of the present invention is the optional provision of a remote door entry system which is easily adapted for use with either a right-hand door handle assembly or a left-hand door handle assembly.

Yet another advantage of the present invention is the optional provision of a remote door entry system which may be configured with or without a motorized deadbolt assembly.

Still other advantages of the present invention will become apparent to those skilled in the art upon a reading and understanding of the present specification.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention. Note, the drawings may not be to scale.

DETAILED DESCRIPTION OF THE PREFERRED EMBODIMENT

Figure 1A:
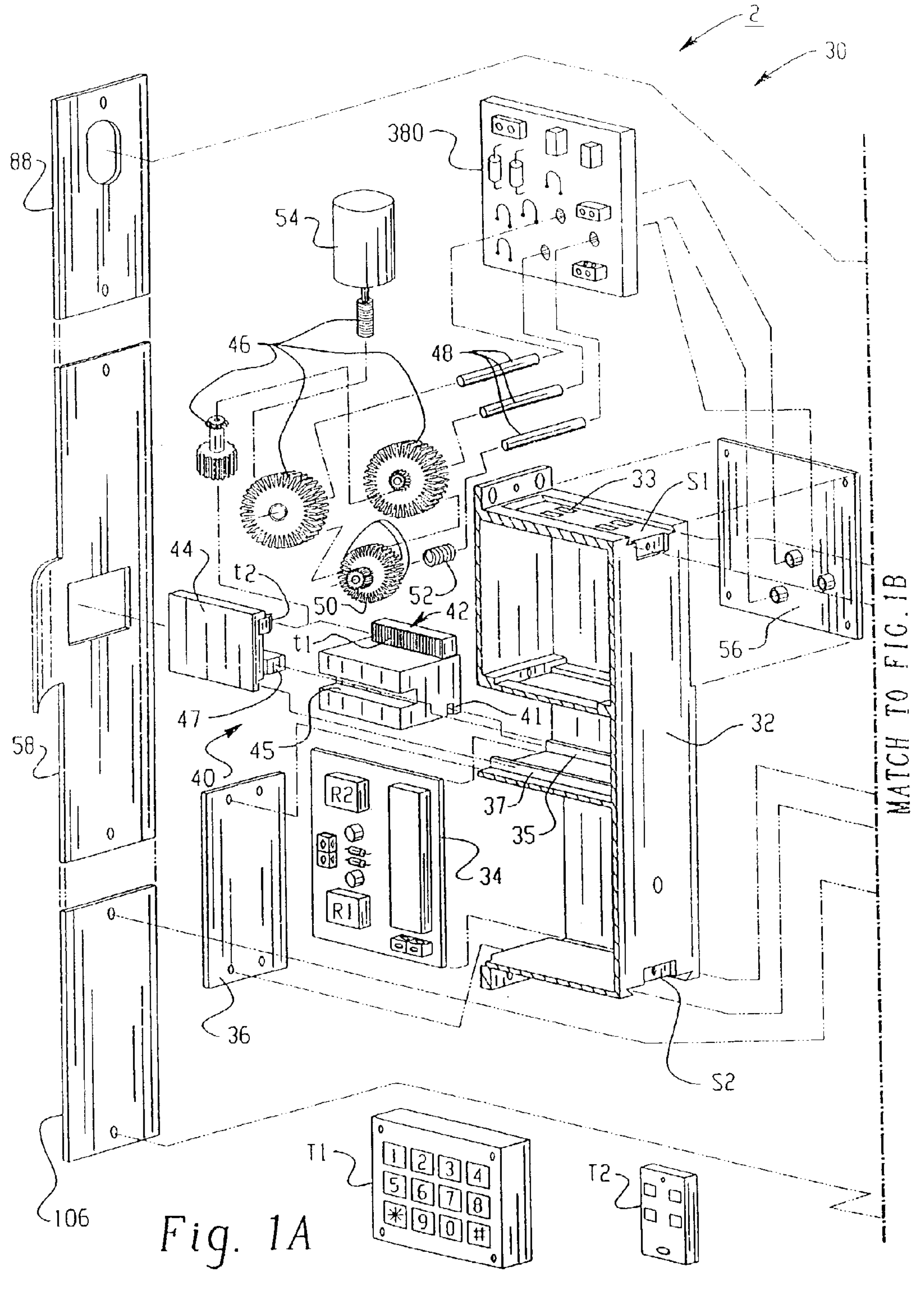
FIGS. 1A and 1B provide an exploded partial section view of a door entry system including a primary assembly, deadbolt assembly, battery unit and transmitters in accordance with aspects of an embodiment of the present invention.
Figure 1B:
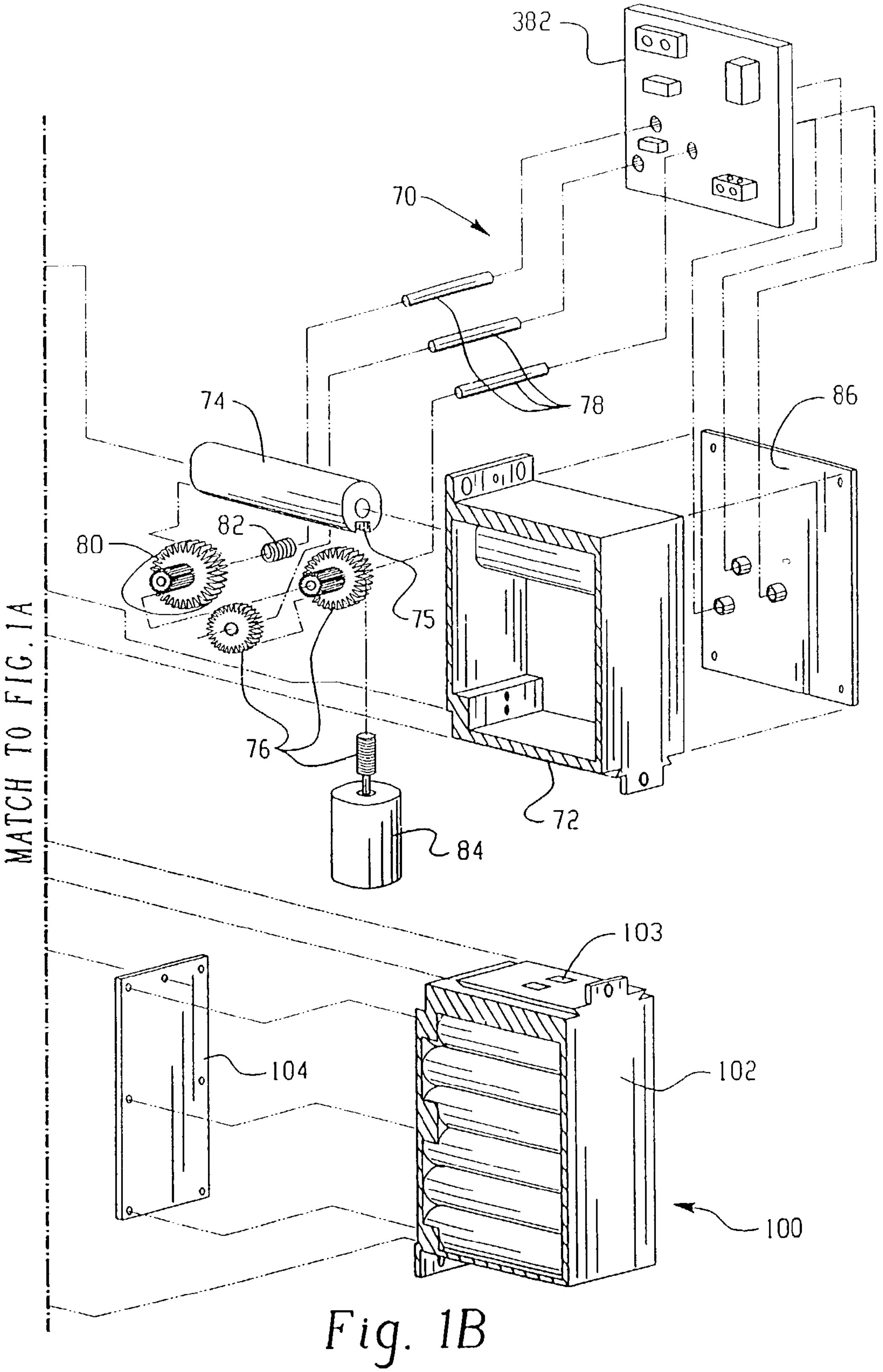

Referring now to the drawings wherein like reference characters indicate like elements, FIGS. 1A and 1B show an exploded partial section view of a door entry system 2, according to a preferred embodiment of the present invention. Door entry system 2 is generally comprised of a primary assembly 30, a deadbolt assembly 70, a battery unit 100, and a cable bracket electrical interface assembly 120 (see FIG. 2A). Assemblies 30, 70, 100 and 120 will each be described in detail below.

Primary assembly 30 includes a housing 32, which houses two electronic control boards 34 and 380, and a dual sliding bolt assembly 40 (described below). A pair of guide rails 35, 37 are provided in housing 32 for guiding slide bolts 42, 44 of dual sliding bolt assembly 40, as will be explained below. Housing 32 has slots S1 and S2, respectively formed at the upper and lower surfaces thereof. Electrical contacts 33 are arranged inside slots S1 and S2 to provide a convenient means for electrically connecting electrical components housed in housing 32 to an electrical power source, and communicating data between the system components. The connection with the electrical power source will be described in detail below. Several cover plates 36, 56 and 86 seal electronic boards 34, 380 and 382 within housings 32 and 72. Electronic controls are arranged on electronic control boards 34, 380 and 382, which control operation of primary assembly 30 and deadbolt assembly 70. In this respect, the electronic controls receive operator instructions, and in accordance therewith control assemblies 30 and 70 to lock and unlock a door and/or secure and unsecure a door. The electronic controls of the present invention will be described in further detail below.

Figure 5A:
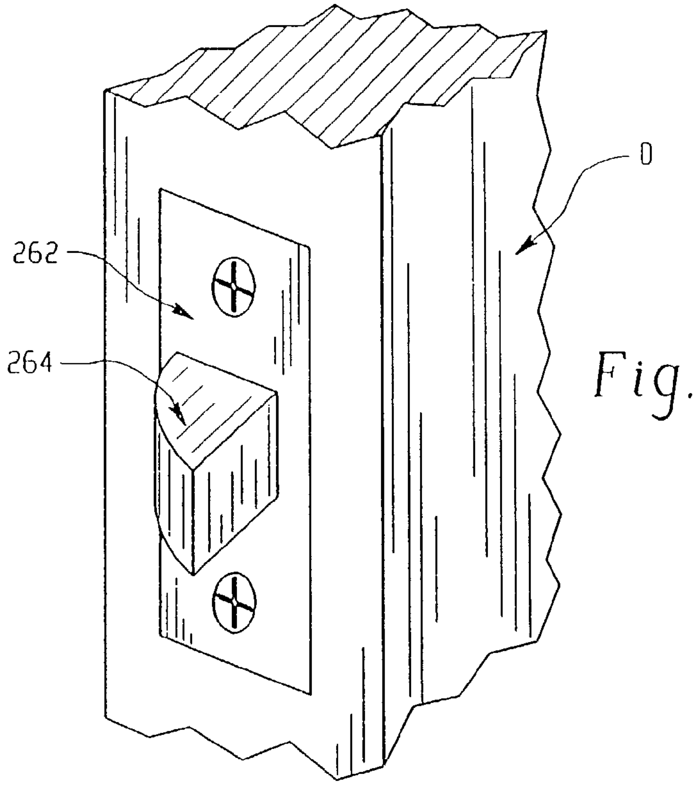
FIG. 5A is a perspective view of a standard latch bolt assembly having only a spring latch bolt.

In one embodiment of the present invention, the primary assembly 30 includes a dual sliding bolt assembly 40 for operating a standard latch bolt assembly, e.g., such as the standard latch bolt assembly shown in FIGS. 5A and/or 5B. As shown, the dual sliding bolt assembly 40 comprises a first slide bolt 42 and a second slide bolt 44. Also shown are a primary gear set 46, primary gear pins 48, a primary gear cam clutch 50 and associated gear clutch spring 52, a DC motor 54, electronic board 380, and a gear box cover plate 56. First slide bolt 42 includes a teeth portion t1, a lower slot 41 and a lateral slot 45. Second slide bolt 44 includes a teeth portion t2 and a guide rail portion 47. Guide rail portion 47 is dimensioned to slide within lateral slot 45. Lower slot 41 of first slide bolt 42 is dimensioned to receive guide rail 35. When rail portion 47 is received with lateral slot 45, another lower slot is formed which is dimensioned to receive guide rail 37. In this manner, motor 54 drives gear set 46, which in turn modifies the position of slide bolts 42 and 44 by engagement with teeth portions t1 and t2. It should be understood that in accordance with a preferred embodiment of the present invention, teeth portions t1 and t2 take the form of gear racks. Selected gears of gear set 46 are mounted to gear pins 48 as illustrated. Gear cam clutch 50 and gear clutch spring 52 are provided to prevent gear set 46 from binding or being damaged if slide bolts 42, 44 or the gear set 46 become bound. Importantly, first slide bolt 42 and second slide bolt 44 move in opposite directions, as they are moved between a “secured” position and an “unsecured” position. It should be noted that gear cam clutch 50 has a cam portion which is used to trip limit switches located on electronic board 380. These limit switches are used to limit the travel of sliding bolts 42, 44, and deadbolt block 64. The operation of the dual sliding bolt assembly 40 will be described in greater detail below.

Figure 2:
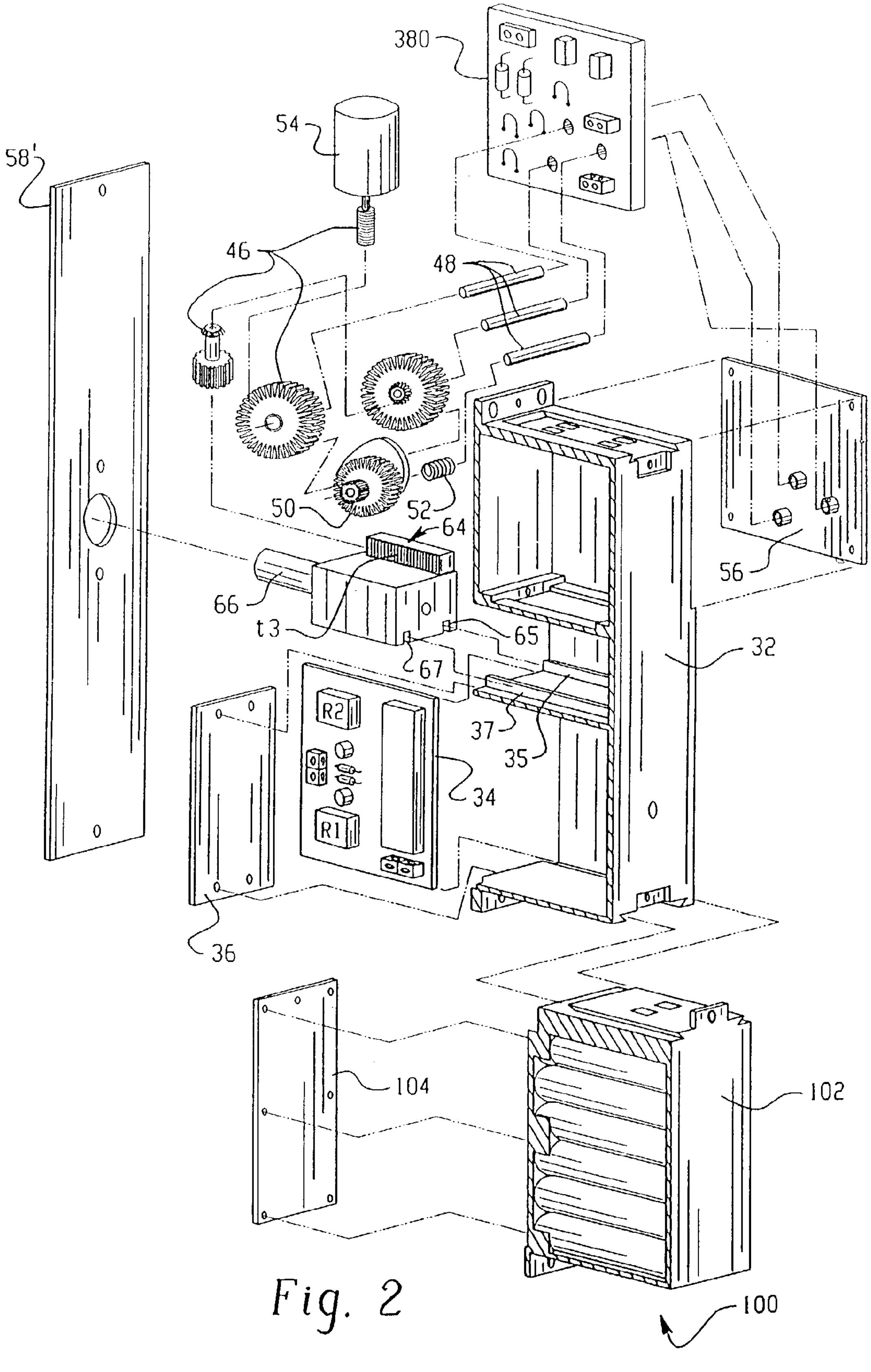
FIG. 2 is an exploded partial section view of a door entry system according to aspects of an embodiment of the present invention with a deadbolt block installed in the primary assembly.

It should be appreciated that in an alternative embodiment of the present invention, the first slide bolt 42 and second slide bolt 44 may be replaced with a deadbolt block 64 (as shown in FIG. 2), where only a deadbolt is desired. Deadbolt block 64 includes a teeth portion t3, a bolt portion 66 and a pair of lower slots 65 and 67. Slots 65 and 67 are dimensioned to receive guide rails 35 and 37 of housing 32. A gear of gear set 46 engages with teeth portion t3 to modify the position of deadbolt block 64. In accordance with a preferred embodiment, teeth portion t3 takes the form of a gear rack. A modified strike plate 58' is used with deadbolt block 64. When the primary assembly 30 is activated to a locked position, deadbolt block 64 moves to an extended position, and protrudes into a door, door jamb/frame, center frame post or the like, to prevent the associated door from being opened.

Deadbolt assembly 70 includes a housing 72, a bolt 74, a deadbolt gear set 76, deadbolt gear pins 78, a deadbolt gear cam clutch 80 and associated gear clutch spring 82, a DC motor 84, a gear box electronic board 382, and deadbolt cover plate 86 (FIG. 1B). It should be understood that the lower surface of housing 72 has electrical contacts formed therein. The electrical contacts are in electrical connection with the electrical components housed in housing 72. Moreover, the lower surface of housing 72 is dimensioned to mate with slot S1 of housing 32. In this manner, the electrical contacts of housing 72 are put into electrical connection with electrical contacts 33 of slot S1. Bolt 74 includes a teeth portion 75. A gear of gear set 76 engages with teeth portion 75 to modify the position of bolt 74. In this regard, motor 84 drives gear set 76, which in turn modifies the position of bolt 74, to move bolt 74 between “unlocked” and “locked” positions. Selected gears of gear set 76 are mounted to gear pins 78 as illustrated. Gear cam clutch 80 and gear clutch spring 82 are provided to prevent gear set 76 from binding or being damaged if bolt 74 becomes bound. It should be noted that gear cam clutch 80 has a cam portion which is used to trip limit switches located on electronic board 382. These limit switches are used to limit the travel of bolt 74. The operation of deadbolt assembly 70 will be described in greater detail below.

Battery unit 100 provides an electrical power source, and includes a battery housing 102, a circuit cover plate 104 and a unit cover plate 106. Battery housing 102 includes a battery compartment for receiving batteries (e.g., standard AA batteries). The batteries provide sufficient energy to power both primary assembly 30 and deadbolt assembly 70. As a result, primary assembly 30 and deadbolt assembly 70 can be powered without a hard wire connection. Electrical contacts 103 are formed in the upper surface of battery housing 102. These electrical contacts are in electrical connection with the batteries. It should be understood that the upper surface of battery housing 102 is dimensioned to be received into slot S2. In this manner, the batteries in battery unit 100 supply electrical power to the electrical components housed in housings 32 and 72.

Figure 2A:
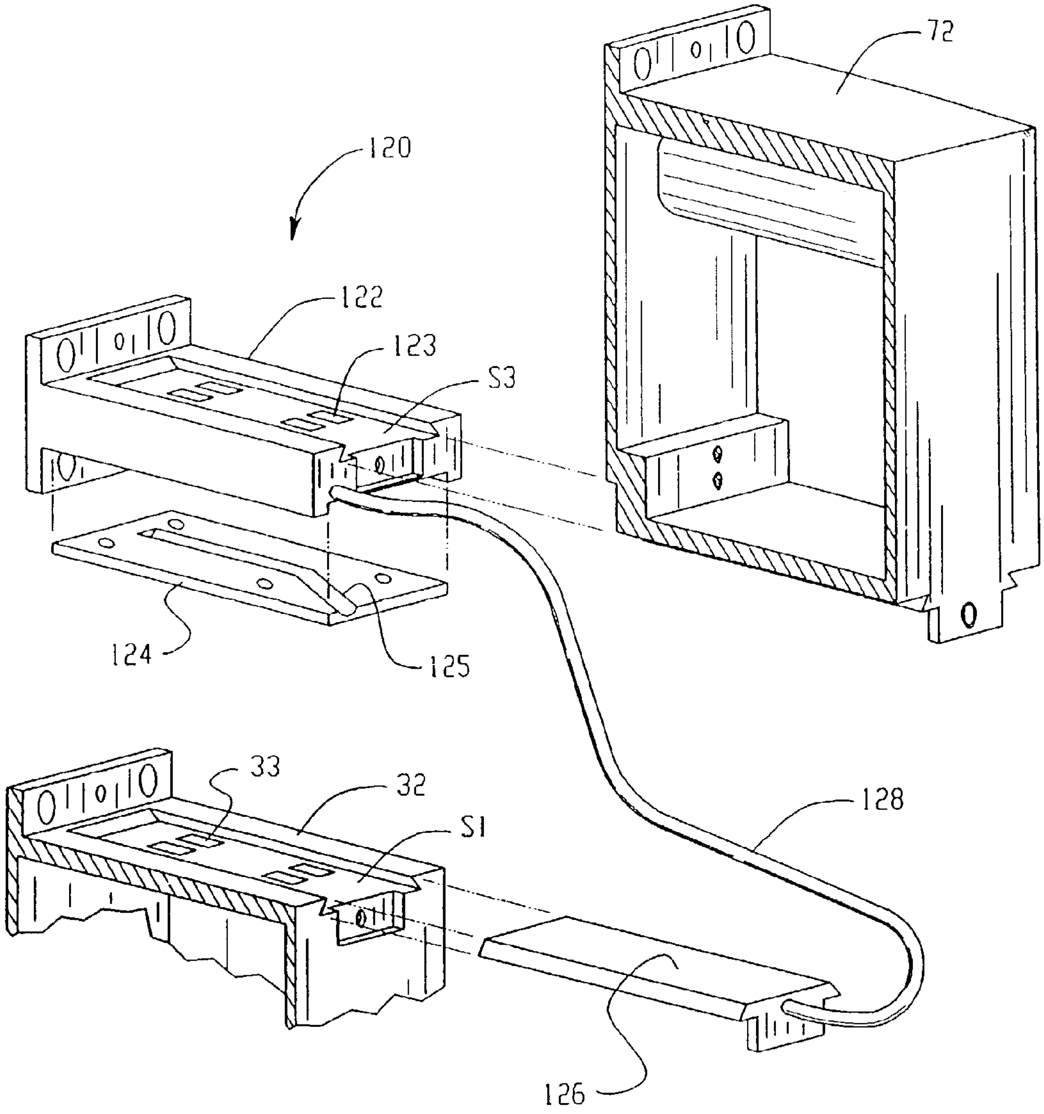
FIG. 2A is an exploded partial section view of a cable bracket electrical interface assembly according to aspects of an embodiment of the present invention.

Referring now to FIG. 2A, cable bracket electrical interface assembly 120 provides a convenient means for communicating data between system components of primary assembly housing 32 and deadbolt assembly housing 72. Moreover, cable bracket electrical interface assembly 120 also provides a convenient means for electrical connection of system components to battery unit 100, or other power source. Cable bracket electrical interface assembly 120 is generally comprised of a “slide-on” offset interface bracket 122, a cable splice access plate 124, a “slide-on” primary interface bracket 126, and a cable 128.

Offset interface bracket 122 includes electrical contacts 123, which are in electrical contact (via cable 128) with electrical contacts (not shown) formed in primary bracket 126. Moreover, slot S3 is dimensioned to mate with lower surface of deadbolt assembly housing 72. Primary interface bracket 126 is dimensioned to mate with slot S1 of the upper surface of housing 32. In this manner electrical connection can be established and maintained between the electrical components of deadbolt assembly housing 72 and primary housing 32, and allow for housing 72 to be located a selectable offset distance from housing 32. Therefore, when cable bracket electrical interface assembly 120 is utilized, deadbolt assembly 70 can be located anywhere on the door, center frame post, or in the narrow doorjamb/frame section between the inner doorstop and the edge of the door casing. An appropriate length of cable 128 is conveniently provided between offset interface bracket 122 and primary interface bracket 126. In this regard, access plate 124 has a slot 125 formed therein which allows for convenient installation of a cable of appropriate length. The end of the cable inserted through slot 125 is connected with electrical contacts 123. Cable 128 is preferably a small diameter flexible cable having a plurality of conductors (preferably 4 conductors), and having a length which suitably varies in accordance with the particular application. Moreover, when offset interface bracket 122 is mated with deadbolt assembly housing 72, interface bracket 122 completes a deadbolt mounting flange, as best seen in FIG. 2A.

It should be understood that the electrical contacts in slot S2 are in electrical connection-with electrical contacts 103 of battery housing 102 (FIGS. 1B and 2), or with the electrical contacts in slide-on primary interface bracket 126 (FIG. 2A).

In an alternative embodiment of the present invention, primary interface bracket 126 and cable 128 may be used separately to connect electrical components with an internal wiring system, which may be located within a wall. In this regard, primary interface bracket 126 is dimensioned to be received in slots S1 or S2 of housing 32 for directly connecting the electrical components of primary lock assembly 30 to electrical power, via an internal wiring system.

It should be further appreciated that in an alternative embodiment of the present invention, housing 72 may be directly connected with housing 32, thus eliminating the need for cable bracket electrical interface assembly 120. In this regard, the lower surface of housing 72 is directly mated with slot S1 of housing 32. Of course, in this case, bolt 74 of deadbolt assembly 70 is located a fixed distance from dual sliding bolt assembly 40.

Figure 6:
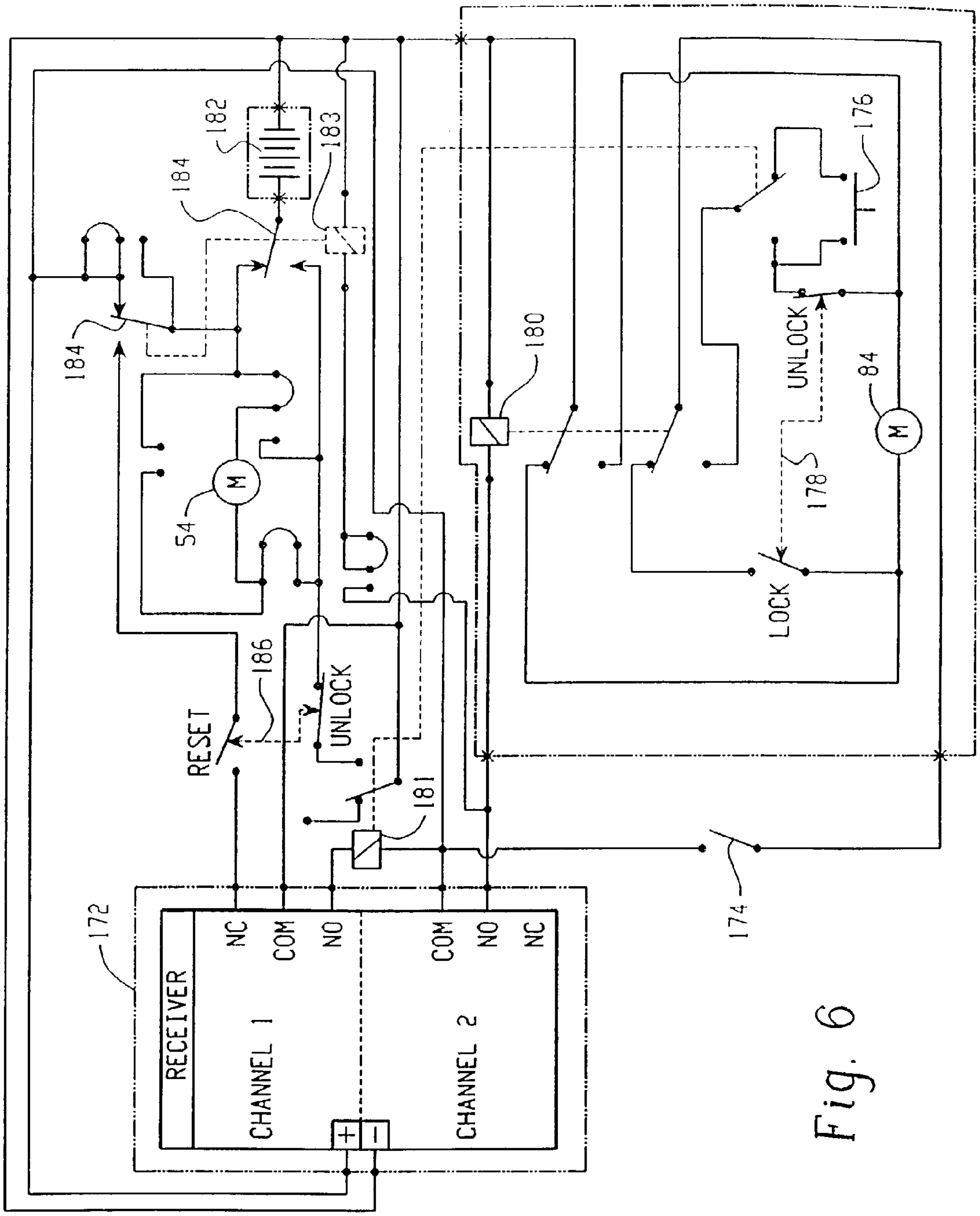
FIG. 6 is a schematic of a electronic controls for a door entry system in accordance with aspect of an embodiment of the present invention.

FIG. 6 shows a schematic of the control electronics of the present invention. The control electronics include a 2-channel (RF) receiver 172, a magnetic reed switch (N.O.) 174, a deadbolt bolt switch 176, deadbolt bolt cam limit switches 178 (N.O. and N.C., respectively), a deadbolt DPDT relay 180, a battery power supply 182 (housed in battery unit 100), two magnetic reed switches 184, primary cam limit switches 186, a combination deadbolt and primary DPDT relay 181 and an optional magnetic reed switch DPDT relay 183 bypass.

The control electronics also include a touch-pad transmitter T1 and a remote transmitter T2, shown in FIG. 1A. Touch-pad transmitter T1 preferably takes the form of a wall-mounted RF combination keypad transmitter, while remote transmitter T2 preferably takes the form of a portable key chain transmitting unit.

Further, either or both transmitters T1, T2 are optionally equipped with a messaging system and/or circuit and visual indicators, e.g., light emitting diodes (LEDs), that announce and or indicate the state of the door entry system 2. Suitably, the messaging system and/or visual indicators are responsive to signals from the transmitters T1, T2 and/or detected states of the various switches employed in the door entry system 2. For example, the messaging system is suitably programmed to play announcements such as "door locking" or "door unlocking" or "door secured" or "door unsecured" as appropriate for corresponding operation of the door entry system 2. Similarly, designated LEDs, e.g., color coded red and green LEDs, may likewise be selectively illuminated to indicate the various states of the door entry system 2. Optionally, the messaging system/circuit and/or visual indicators may also be incorporated in the primary assembly 30, deadbolt assembly 70 or elsewhere.

Figure 4A:
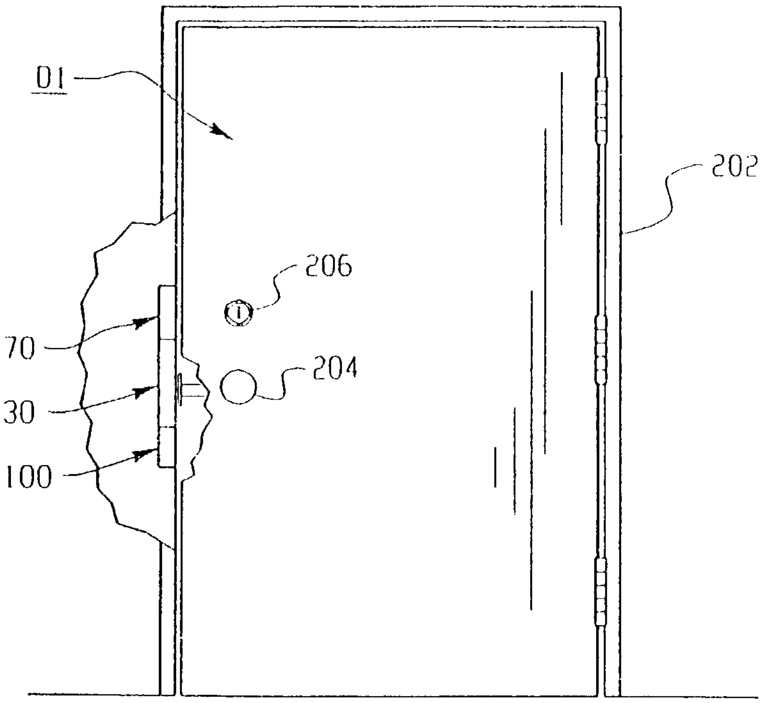
FIG. 4A is a partial cutaway view of a typical single door installation of a door entry system in accordance with aspects of the present invention.
Figure 4B:
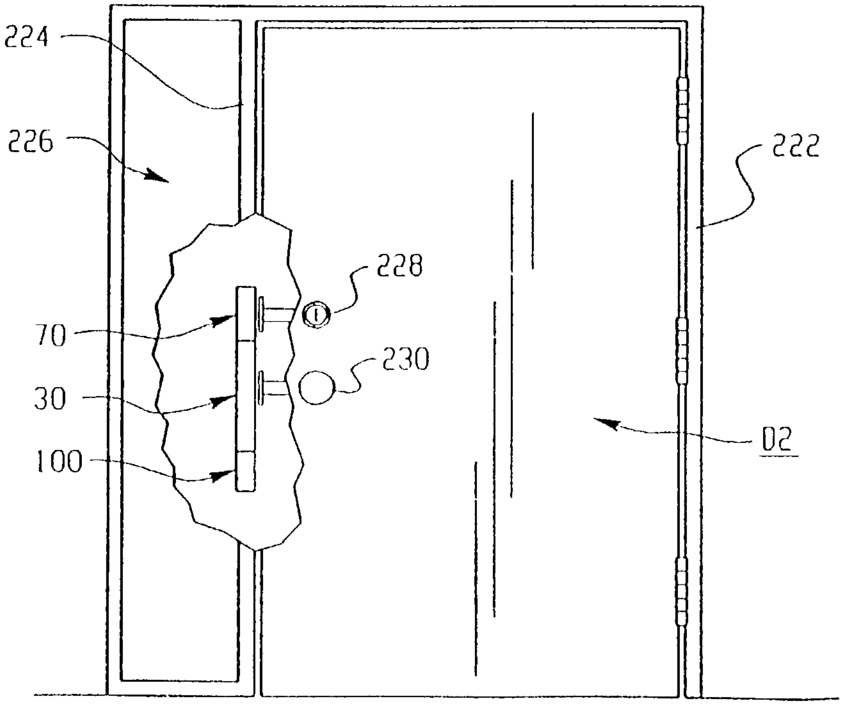
FIG. 4B is a partial cutaway view a typical single door with side light glass unit.
Figure 4C:
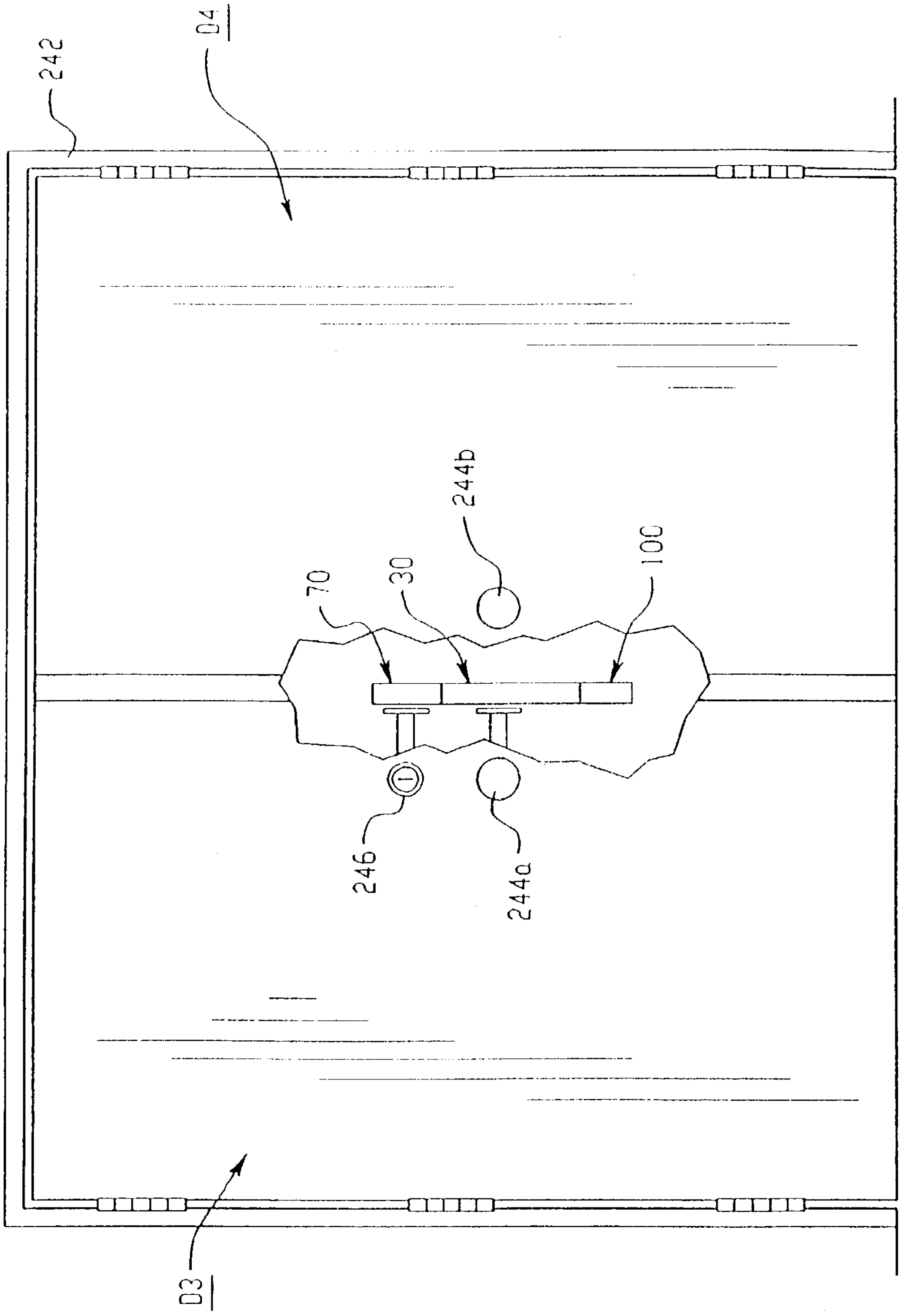
FIG. 4C is a partial cutaway view showing installation of a door entry system in accordance with aspects of the present invention in a typical double door.

It will be appreciated that door entry system 2 is suitable for use in connection with numerous types of applications, e.g., including a single door application (see FIG. 4A), a single door with a side light glass unit (see FIG. 4B), and a double door application (see FIG. 4C). In this regard, components of door entry system 2 are suitable for installation in a door jamb/frame, as shown in FIG. 4A. In the embodiment shown in FIG. 4A, single door D1 is attached by a hinge to a door jamb/frame. A door handle 204 and mechanical deadbolt 206 form a part of the door security. Primary assembly 30, deadbolt assembly 70 and battery unit 100 are shown concealed behind door casing 202. In the embodiment shown in FIG. 4B, single door D2 is attached by a hinge to a door jamb/frame. A door handle 230 and mechanical deadbolt 228 form a part of the door security. Primary assembly 30, deadbolt assembly 70 and battery unit 100 are shown concealed in center frame post 224 behind door casing 222 adjacent to side light glass unit 226. In the embodiment shown in FIG. 4C, active door D3 and passive door D4 are attached by hinges to a door jamb/frame. A door handle 244*a*, a door handle 244*b* and mechanical deadbolt 246 form a part of the door security. Primary assembly 30, deadbolt assembly 70 and battery unit 100 are shown concealed in the edge of door D4. Door casing 242 is not used at this time to conceal assemblies 30, 70 or 100. It should be appreciated that the versatility of the present invention is due to the slim profile of the assemblies described above. Preferably, the assemblies do not exceed a width of 1¼ % inch.

Figure 5B:
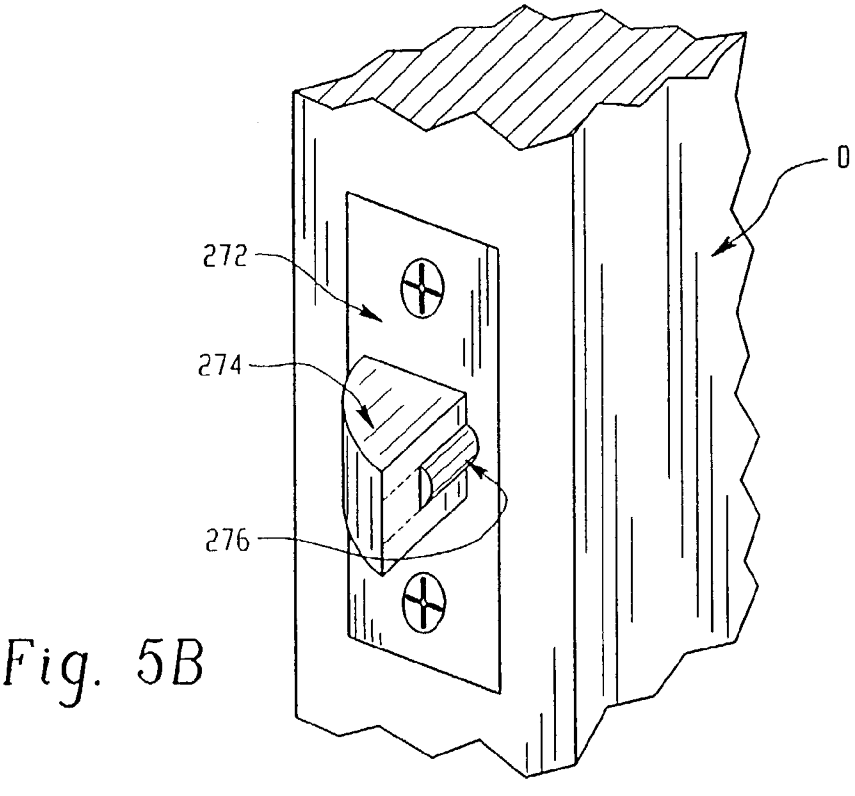
FIG. 5B is a perspective view of a standard latch bolt assembly having both the spring bolt and a dead latch bolt.

The operation of door entry system 2, will now be described in further detail. Primary assembly 30 operates a door's standard latch bolt assembly having only a spring latch bolt (as shown in FIG. 5A) or also including a dead latch bolt (as shown in FIG. 5B). FIG. 5A illustrates a typical latch bolt assembly comprised of a spring latch bolt housing 262 mounted inside door D, and a spring latch bolt 264. FIG. 5B illustrates another typical latch bolt assembly comprised of a housing 272 mounted inside door D, a spring latch bolt 274, and a dead latch bolt 276. Because of the versatility of the present invention, the existing door handle and/or latch bolt assembly mechanisms that already exists on the door do not have to be modified for use in connection with door entry system 2.

Figure 3A:
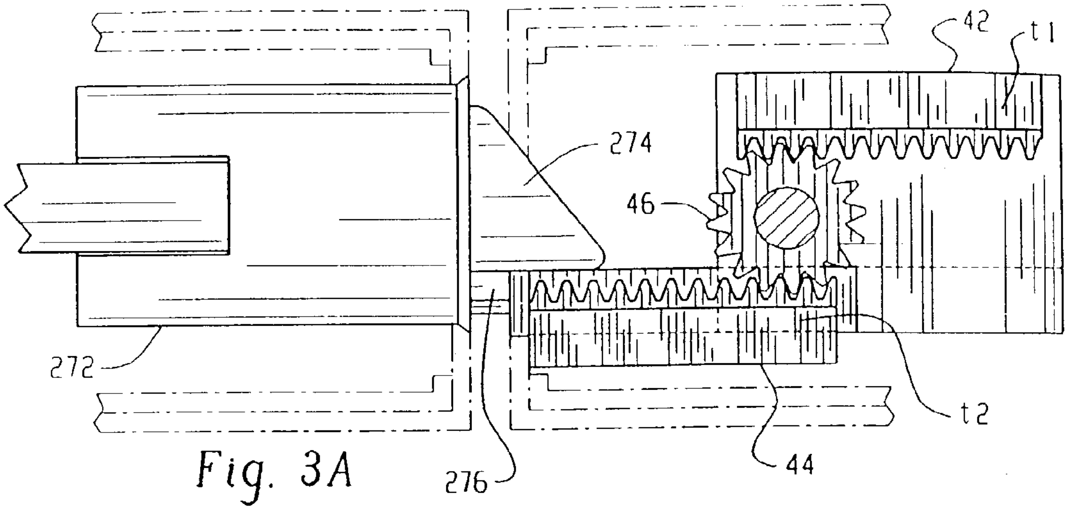
FIGS. 3A, 3B and 3C are top views showing a dual sliding bolt assembly of FIG. 1A in a secured position, an intermediate position, and an unsecured position, respectively.
Figure 3B:
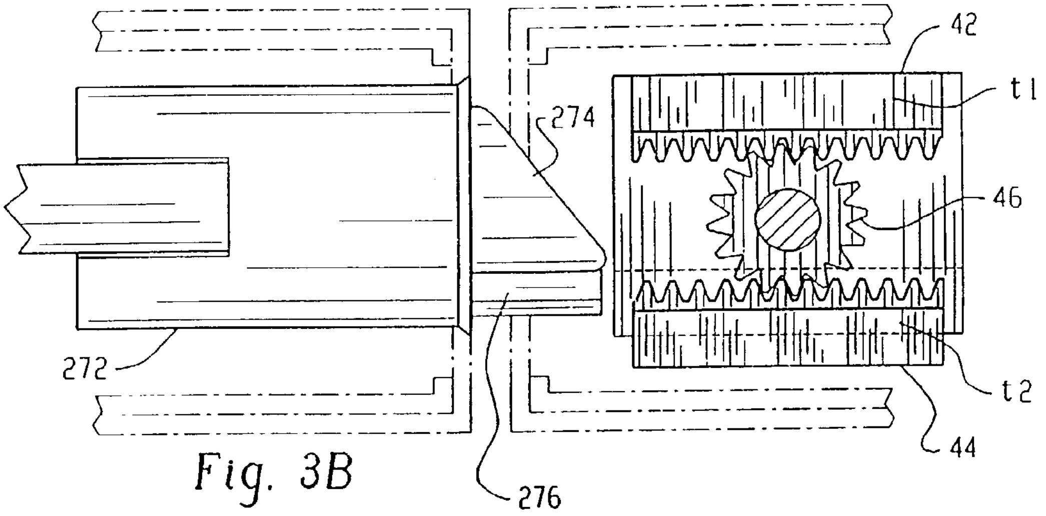
Figure 3C:
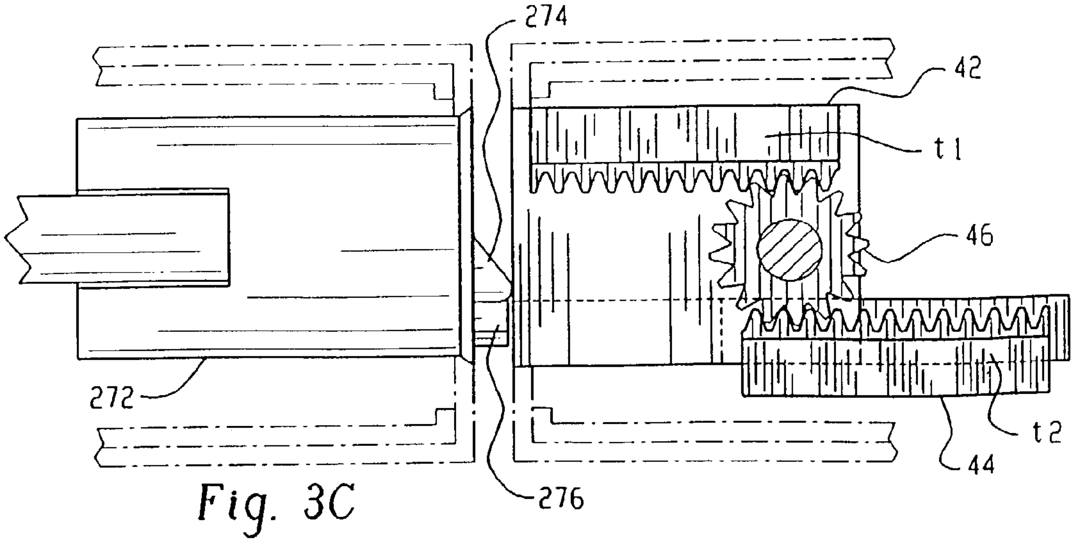
Figure 3D:
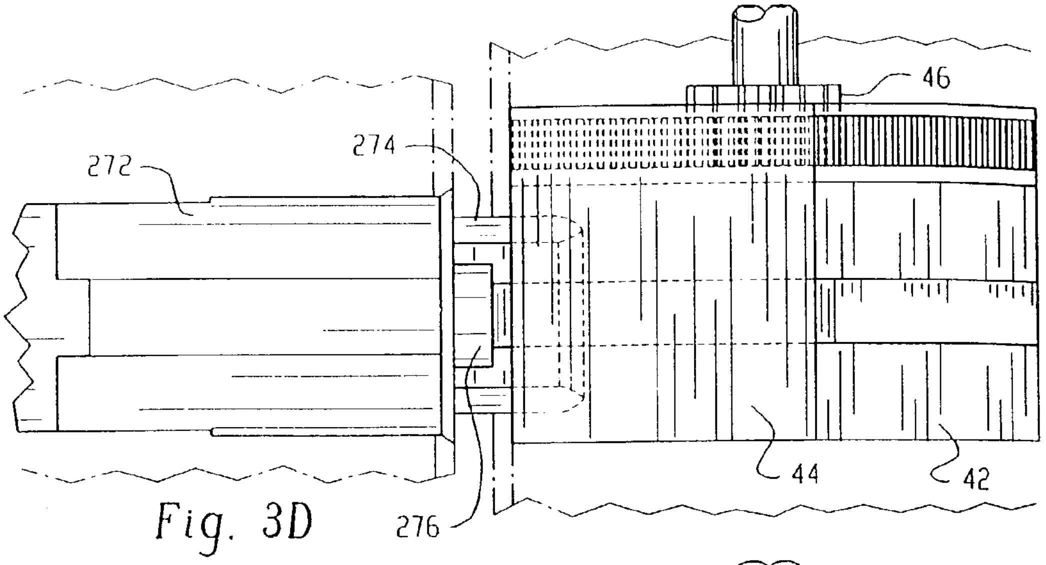
FIGS. 3D, 3E and 3F are side views corresponding to FIGS. 3A, 3B and 3C, respectively.
Figure 3E:
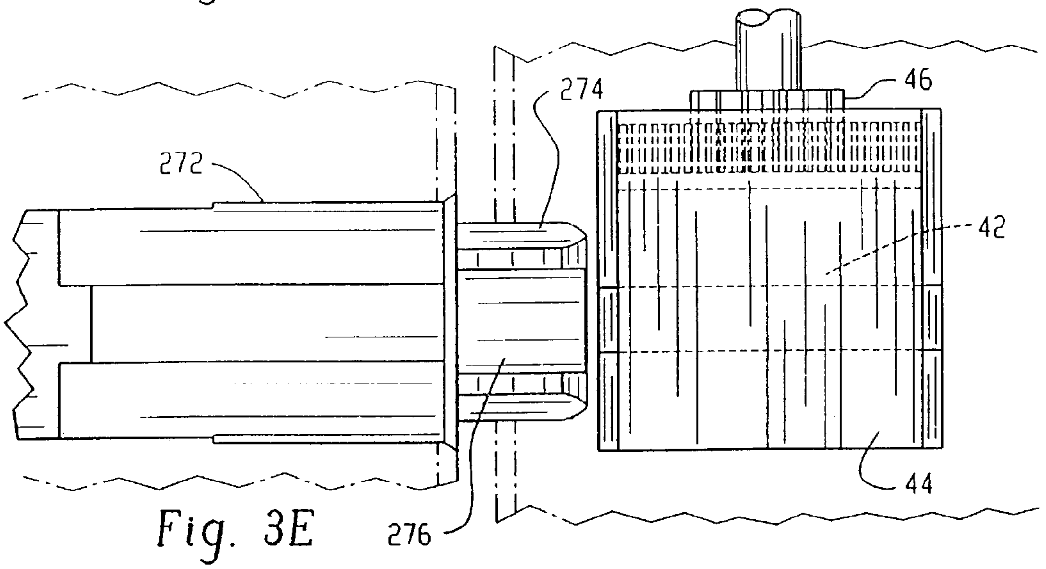
Figure 3F:
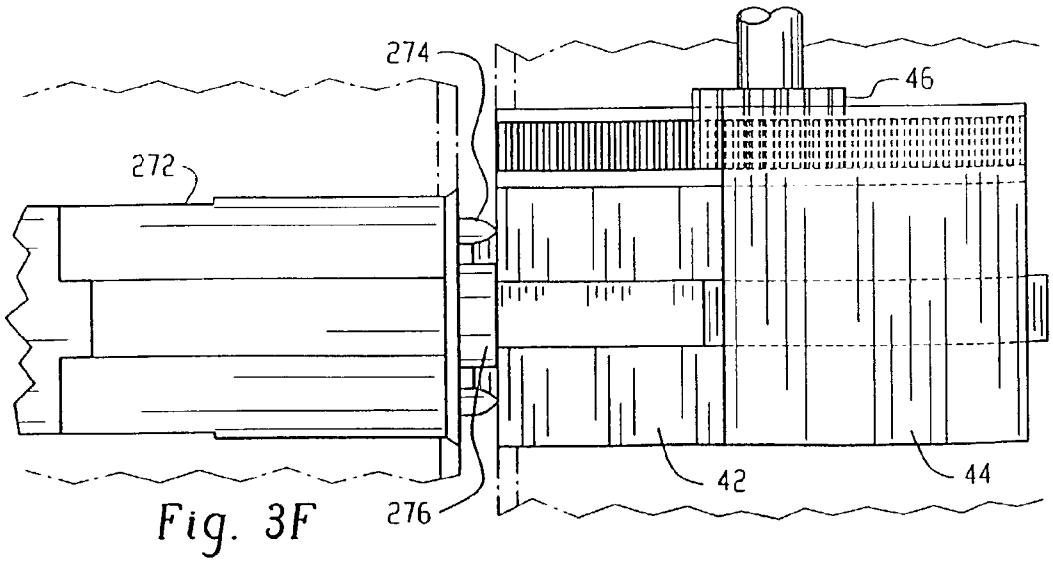

FIGS. 3A and 3D illustrate slide bolts 42, 44 in a "secured" position, FIGS. 3B and 3E illustrate slide bolts 42, 44 in an "intermediate" position, while FIGS. 3C and 3F illustrate slide bolts 42, 44 in an "unsecured" position. In the "secured" position slide bolt 44 engages and compresses dead latch bolt 276, while slide bolt 42 is disengaged from spring latch bolt 274. When activated to an "unsecured" position, gear 46 rotates and moves slide bolts 42, 44 in opposite directions. In this regard, slide bolt 42 moves toward housing 272 (i.e., extends), while slide bolt 44 moves away from housing 272 (i.e. retracts), to disengage and release dead latch bolt 276. The intermediate position is shown in FIGS. 3B and 3E. Dead latch bolt 276 is released by second slide bolt 44, just as the first slide bolt 42 begins to compress both latch bolts 274 and 276. When the "unsecured" position is reached, slide bolt 42 engages and compresses both spring latch bolt 274 and dead latch bolt 276 (FIGS. 3C and 3F). As a result, the door is unsecure and absent any other engaged securing or locking mechanisms can be opened by merely pushing on the door. It will be appreciated that when slide bolts 42, 44 are in the "secured" position, and no deadbolt assembly 70 is in operation, the door may not actually be locked, but rather operation of a door handle has to be used to open the door.

In many cases, primary assembly 30 is used in conjunction with deadbolt assembly 70. When deadbolt assembly 70 is activated to a "locked" position, bolt 74 moves to an extended position, and protrudes into a door, door jamb/frame, center frame post, or the like, to prevent the associated door from being opened. When deadbolt assembly is activated to an "unlocked" position, bolt 74 moves to a retracted position inside deadbolt housing 72. Suitably, as the bolt 74 moves to the retracted position, the first and second slide bolts 42, 44 of dual sliding bolt assembly 40 will simultaneously move to an "unsecured position" (FIGS. 3C and 3F).

It should be understood that when an operator opens the unlocked door, several magnetic reed switches 174 and 184 located in housing 32 of primary assembly 30 will automatically reset the dual sliding bolt assembly 40, but not the motorized bolt 74, which is in the "unlocked" position. Bolt 74 will stay in the "unlocked" position until the operator decides to activate deadbolt assembly 70. When activated, bolt 74 extends to a "locked" position, wherein bolt 74 locks the associated door.

When an operator wants to remotely unsecure a door having a standard latch bolt assembly door handle (as shown in FIGS. 5A and/or 5B), all that is required is a single press of an open/unlock button on remote transmitter T2, or alternatively the operator can enter an access code on touch pad transmitter T1. Receiver 172 opens and closes a set of contacts that permit DC motor 54 to be powered, which in turn rotates gear set 46. This rotation of the gears causes first and second slide bolts 42, 44 to move to the "unsecured" position from the "secured" position (FIGS. 3A–3F). With dual sliding bolt assembly 40 in the "unsecured" position, latch bolts 274 and 276 are both compressed, thus allowing an operator to simply push the door open. When the door is opened, magnetic reed switches 174 and 184, located in housing 32 of primary assembly 30, will automatically reset the first and second slide bolts 42, 44. Therefore, as soon as the operator closes the door, the primary assembly 30 is already reset to the "secured" position.

It should be appreciated that primary assembly 30 does not interfere with the standard operation of any door handle arrangement. That is to say, the operator may still manually open the door in the above arrangements with appropriate operation of the door handle and/or its original door handle key set. However, even if the door handle remains locked manually via the original door handle key set, the primary assembly 30 may still be selectively operated to move the dual sliding bolt assembly 40 into the "unsecured" position to thereby allow opening of the door without having to manually unlock the door handle via the original door handle key set.

When the operator wants to remotely "lock" a door with deadbolt assembly 70, all that is required is a single press of a close/lock button on key chain transmitter T2, or the operator can punch in the access code on wall mounted RF combination keypad transmitter T1. Receiver 172 opens and closes a set of contacts that permits the DC motor 84 to be powered, which in turn rotates deadbolt gear set 76. Rotation of the gears causes bolt 74 to move to an extended position toward the front of the housing, until the bolt 74 is fully extended, thus not allowing the door to be opened.

When the operator wants to "unlock" a door the operator has two options. The first option is to use transmitters T1 or T2, and the second option is the use of the original door key. When the operator presses the open/unlock button on key chain transmitter T2 or the operator enters an access code on the wall mounted RF combination keypad transmitter T1, receiver 172 opens and closes a set of contacts that permits both DC motors 54 and 84 to be powered, which in turn rotates both gear sets 46 and 76. The rotating gears cause bolt 74 and first and second slide bolts 42, 44 to move. Bolt 74 will fully retract into housing 72 while at the same time slide bolts 42, 44 move to the "unsecured" position releasing the door's latch bolt assembly. This allows the operator to simply push the door open.

Figure 7A:
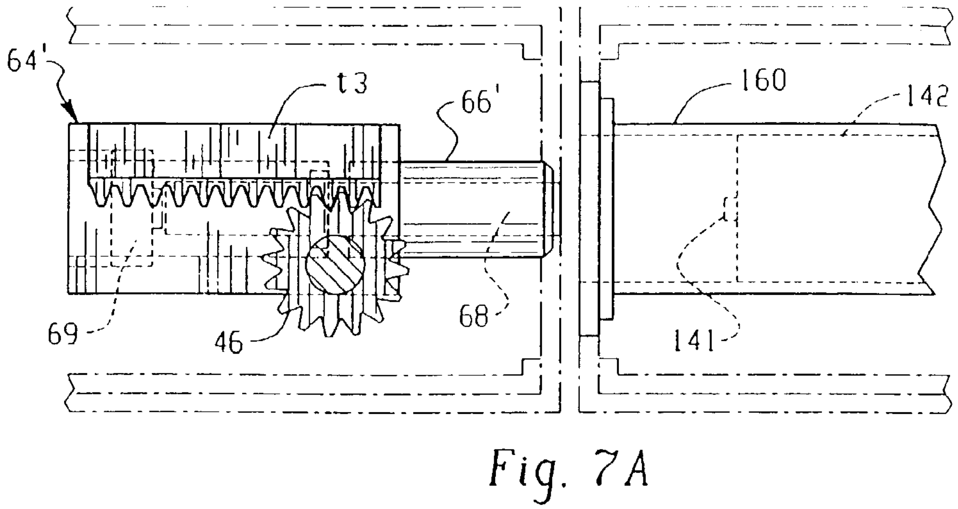
FIGS. 7A, 7B and 7C are top views of a deadbolt block assembly according to aspects of the present invention, shown in an unlocked position, a locked position, and an intermediate position, respectively.
Figure 7B:
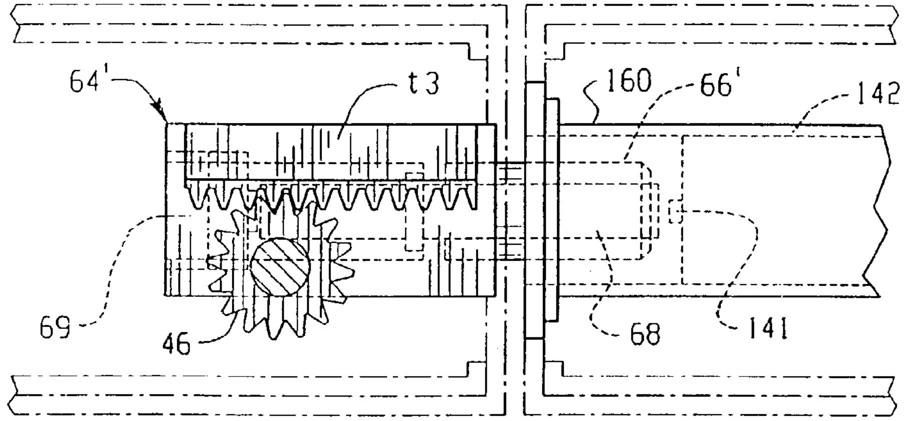
Figure 7C:
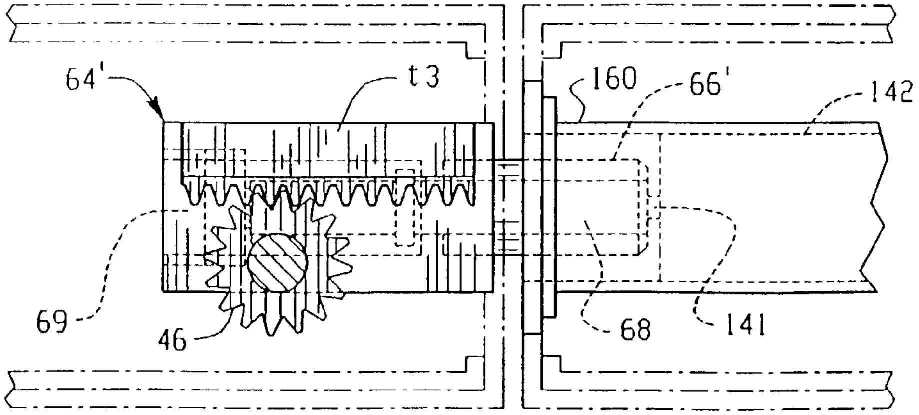

Referring now to FIGS. 7A–7C, an alternative embodiment of a deadbolt block assembly will be described. Deadbolt block assembly 64' is similar in many respects to deadbolt block 64 and deadbolt bolt 74, described above. However, deadbolt block 64' has a modified bolt portion 66'. In this regard, bolt portion 66' is bored and counter bored to provide a recess for receiving a spring loaded button switch 69 (which preferably takes the form of a miniature or sub-miniature snap-switch). A hardened steel plunger rod 68 preferably protrudes approximately 1/16 of an inch outside the front face of bolt portion 66' when disengaged. Button switch 69 also includes an electrical connection interface, which is connected with a latching circuit. Deadbolt block assembly 64' can be used as a substitute for slide blocks 42, 44, deadbolt bolt 74, or deadbolt block 64. Moreover, suitable housings and electrical components may be provided to allow deadbolt block assembly 64' to be used together with slide blocks 42, 44, as will be described in further detail below.

Figure 8:
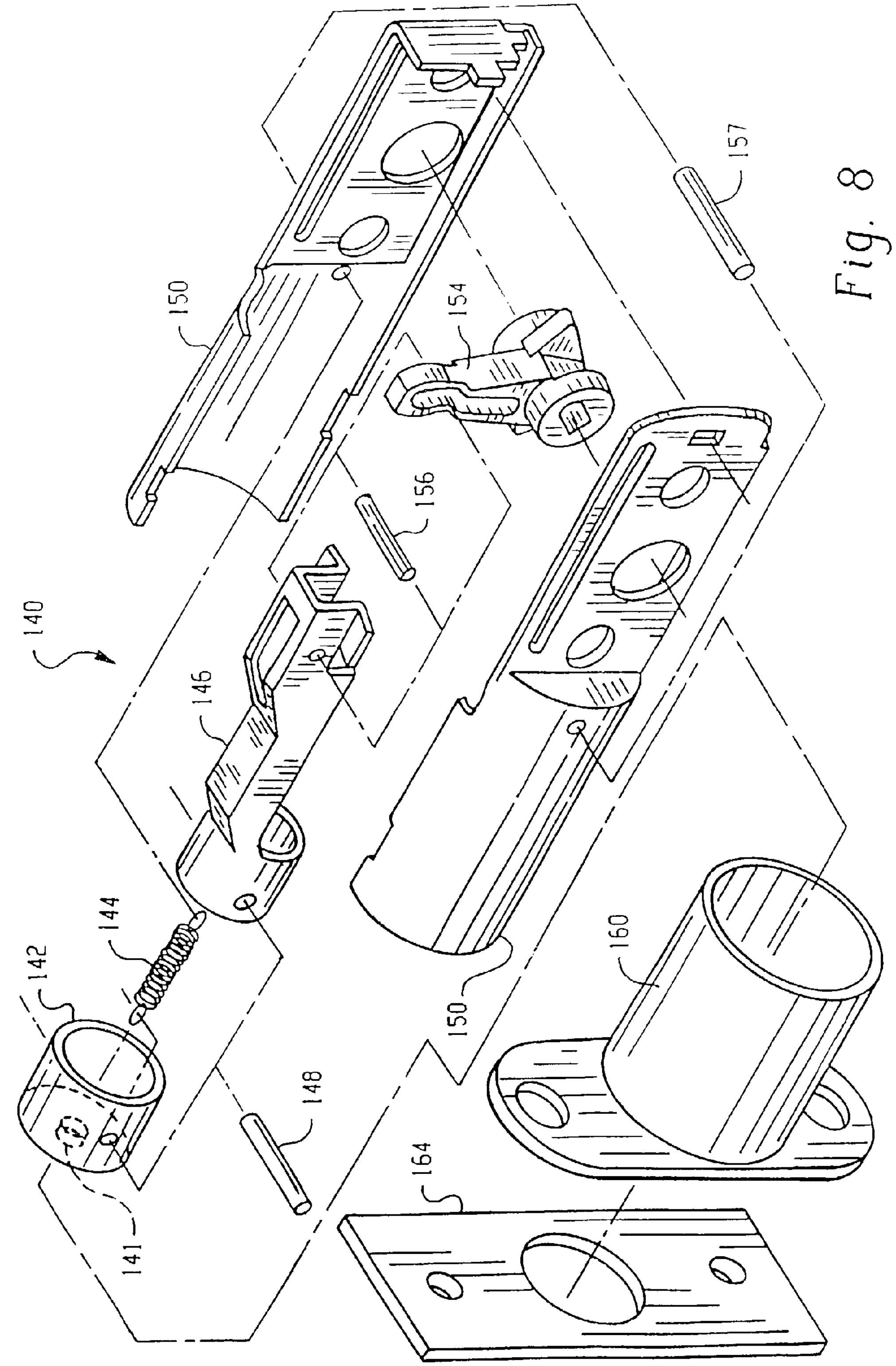
FIG. 8 is an exploded view of a deadbolt receiving assembly according to aspects of the present invention.

Suitably, the deadbolt block assembly 64' is used in conjunction with a deadbolt receiving assembly 140 (see FIG. 8) that is optionally retrofit into an existing or original deadbolt opening/cutout of the door and optionally employs the same key cylinder and/or key. An exploded view of the deadbolt receiving assembly 140 is illustrated in FIG. 8. Assembly 140 is generally comprised of a forward bolt section 142, a rearward bolt push rod section 146, a rearward casing 150, and a push lever operating means 154. A lever pin 156 is slid between lever operating means 154 and pressed into bolt push rod section 146. Forward bolt section 142 includes a protuberance 141 on its front face, and is fixed to rearward bolt push rod section 146. A return spring 144 is attached to forward bolt section 142 by bolt guide pin 148. Spring 144 is also attached to pin 157, such that spring 144 biases (i.e. pulls) forward bolt section 142 toward pin 157 (i.e., the retracted position). A face plate 164 is attached to a forward casing 160. Forward casing 160 has an opening dimensioned to receive rearward casing 150. When a rotational force is applied to lever operating means 154 (e.g., via turning a key inserted in the original deadbolt key cylinder that is operatively connected to the lever operating means 154), forward bolt section 142 moves forward toward the face plate 164. When assembly 140 is in the retracted position, it is not flush to the faceplate, like the traditional deadbolt, but instead is automatically retracted by spring 144 approximately 1 inch within casing 160 and 150. This retracted position allows bolt portion 66' to be received into the door mounted modified housing, a depth of approximately ¾ of an inch thus, preventing the door from being opened (see FIG. 7B). Deadbolt block assembly 64' can be retracted with a key, with key chain transmitter T2, or with a surface mounted touch combination pad transmitter T1.

Suitably, deadbolt block assembly 64' operates in the following manner. If the original deadbolt key is used to open/unlock the door, all the operator needs to do is to insert the key in the door's original deadbolt key cylinder and turn the key until the plunger rod 68 is pushed by forward bolt section 142, which in turn compresses button switch 69 (see FIG. 7C). When button switch 69 is compressed, a latching circuit is activated. Activation of the latching circuit causes the deadbolt block assembly 64' to retract, e.g., via rotation of gear 46 that messes with teeth t3, thereby removing the bolt portion 66' from the casing 160 (see FIG. 7A). Suitably, the first and second slide bolts 42, 44, if employed, are also optionally moved at the same time (e.g., within one second) to the unsecured position thus allowing the door to be opened. When the operator opens the door, several magnetic reed switches located in housing 32 will automatically reset first and second slide bolts 42, 44 to the secured position while leaving deadbolt block 64' in the unlocked/retracted position. Therefore, as soon as the operator closes the door, the primary assembly 30 is already set to the secure position so that the operator is able to remotely lock deadbolt block 64' if desired.

Suitably, a manual key unlocking sequence is initiated when the existing door's deadbolt key is inserted into the deadbolt's key cylinder and the deadbolt bolt is manually moved out into the traditional extended position. The reason moving the door's deadbolt bolt into the extended position does not lock the door, is due to the fact that the door's standard deadbolt bolt latch body housing assembly is replaced or retrofit with the deadbolt receiving assembly 140, while still using the deadbolt's existing key cylinder.

To open the deadbolt locked door shown in FIG. 7B, using a key, the operator merely inserts the key into the door's deadbolt, and turns the key so that protuberance 141 of forward bolt section 142 contacts and depresses the rod 68 within bolt portion 66' of extended deadbolt block assembly 64' (see FIG. 7C). As indicated above, extended deadbolt block assembly 64', which already has bolt portion 66' received in deadbolt receiving assembly 140, has a hardened steel plunger rod 68 protruding (approximately 1⁄16 of an inch) from the face/end of bolt portion 66'. When compressed, the spring plunger button switch 69 activates a latching retract circuit. The activated latching circuit automatically retracts deadbolt block assembly 64' into the unlocked position (see FIG. 7A) and optionally moves the first and second slide bolts 42, 44 to the unsecured position within moments (e.g., approximately one second), thus allowing the door to be opened. It should be noted that the spring plunger button switch 69 is centered and recessed on the rear of deadbolt block assembly 64', and is also centered with the rod 68 that is centered with forward bolt section 142 and protuberance 141. When in the locked position, forward bolt section 142 and bolt portion 66' have approximately 1⁄4 of an inch air gap between each other (see FIG. 7B). Deadbolt block assembly 64' can also be remotely operated, powered, and has the same tamper resistant qualities as mentioned above in connection with primary lock assembly 30 and deadbolt assembly 70.

Assuming an initial unlocked position as shown in FIG. 7A, to manually lock the deadbolt block assembly 400 using the system's electrical power, the user inserts the deadbolt key into the deadbolt's key cylinder and temporarily turns it, e.g., approximately a quarter of a turn, until the protuberance 141 on the forward bolt section 142 of the bolt receiving assembly 140 pushes in the rod 68 a distance, e.g., of approximately 1⁄8 of an inch, which will in turn trip the switch 69. Tripping the switch 69 in this instance activates electrically powered locking of the deadbolt block assembly 64', i.e., moving the deadbolt block assembly 64' forward such that the bolt section 66' is received in deadbolt receiving assembly 140 (see FIG. 7B). Note, that after temporarily turning the key forward to activate the switch 69, the user will then release it and/or turn it backward to remove the key from the key cylinder, thereby allowing the forward bolt section 142 to retreat into the bolt receiving assembly 140 under the influence of spring 144 so as to make room therein for the advancing bolt portion 66' of the deadbolt block assembly 64'. Optionally, after activation of the switch 69, there may be a slight delay before the deadbolt block assembly 64' is advanced to allow time for the forward bolt section 142 to be retracted into the bolt receiving assembly 140.

Referring now to FIGS. 9 and 10A–10C an alternative embodiment for the dual sliding bolt assembly will be described. Dual sliding bolt assembly 340 is similar in many respects to dual sliding bolt assembly 40. However, dual sliding bolt assembly 340 uses a cam member 350 to modify the position of first and second slide bolts 342 and 344. In this regard, first and second slide bolts 342 and 344 respectively include a generally sloped cam portion C1 and a generally sloped cam portion C2 for engaging with cam member 350. The cam portions C1 and C2 replace the teeth portions t1 and t2 described above in connection with slide bolts 42 and 44. Use of a cam allows for a reduction in space needed for operation of slide bolts. In this regard, the slide bolts do not need to be offset from each other in the manner described above in connection with slide bolts 42 and 44.

Cam member 350 includes a pair of cam arms 352*a* and 352*b*, which are transverse to each other (e.g., generally perpendicular). Moreover, cam arms 352*a* and 352*b* are not coplanar, but rather are offset from each other. Each cam arm 352*a*, 352*b* includes a rotatable disk 354 at the two distal ends thereof. The rotatable disks 354 engage with cam portions C1 and C2, as will be described below with reference to FIGS. 10A–10C. Cam arm 352*a* is engageable with cam portion C1, while cam arm 352*b* is engageable with cam portion C2. Each slide bolt 342, 344 may be biased away from strike plate 58. For instance, a spring (not shown) may be attached between each slide bolt 342, 344 and housing 32. The spring may be attached to slide bolts 342, 344 by boring a hole in the respective slide bolts 342, 344 and hooking the spring to a pin located therein.

Figure 9:
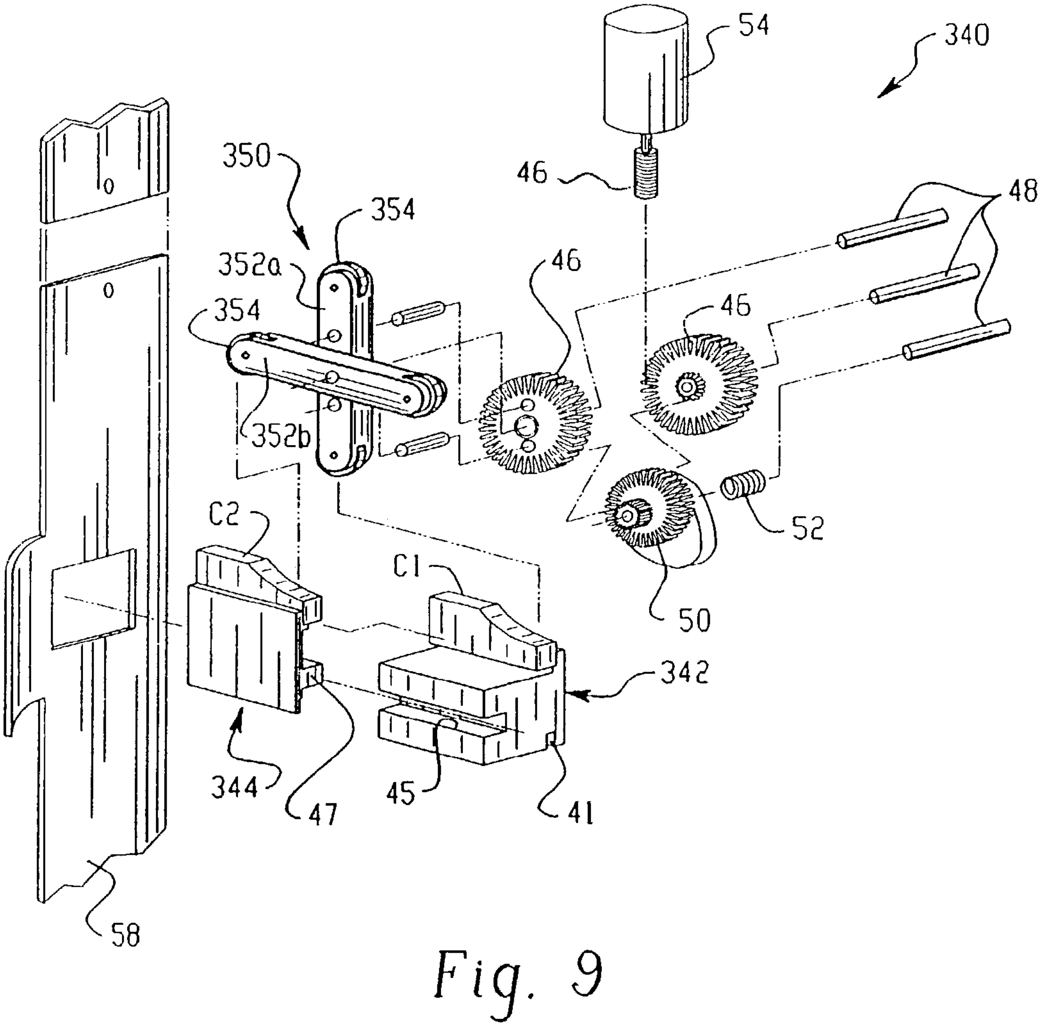
FIG. 9 is an exploded view show an alternative mechanism for driving the dual sliding bolt assembly in accordance with aspects of the present invention.

It should be appreciated that the cam arrangement illustrated in FIG. 9 is shown solely for the purpose of illustrating a preferred embodiment of the present invention, and that other cam arrangements are also suitable. For instance, the cam member could be configured with cam arms that have only one distal end. The use of two distal ends for each cam arm allows for faster setting/resetting of the sliding bolt assembly. Moreover, each cam arm could be configured with more than two distal ends to allow for even faster setting/resetting of the sliding bolt assembly.

Figure 10A:
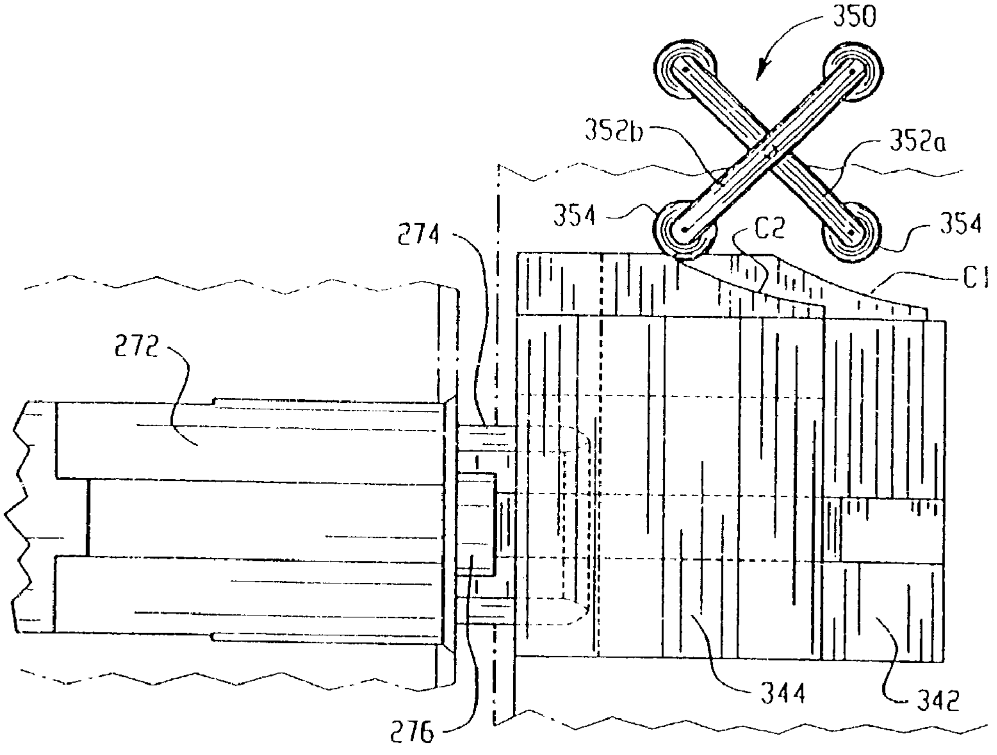
FIGS. 10A, 10B and 10C are side views showing the dual sliding bolt assembly of FIG. 9 in a “secured” position, an intermediate position, and an “unsecured” position, respectively.
Figure 10B:
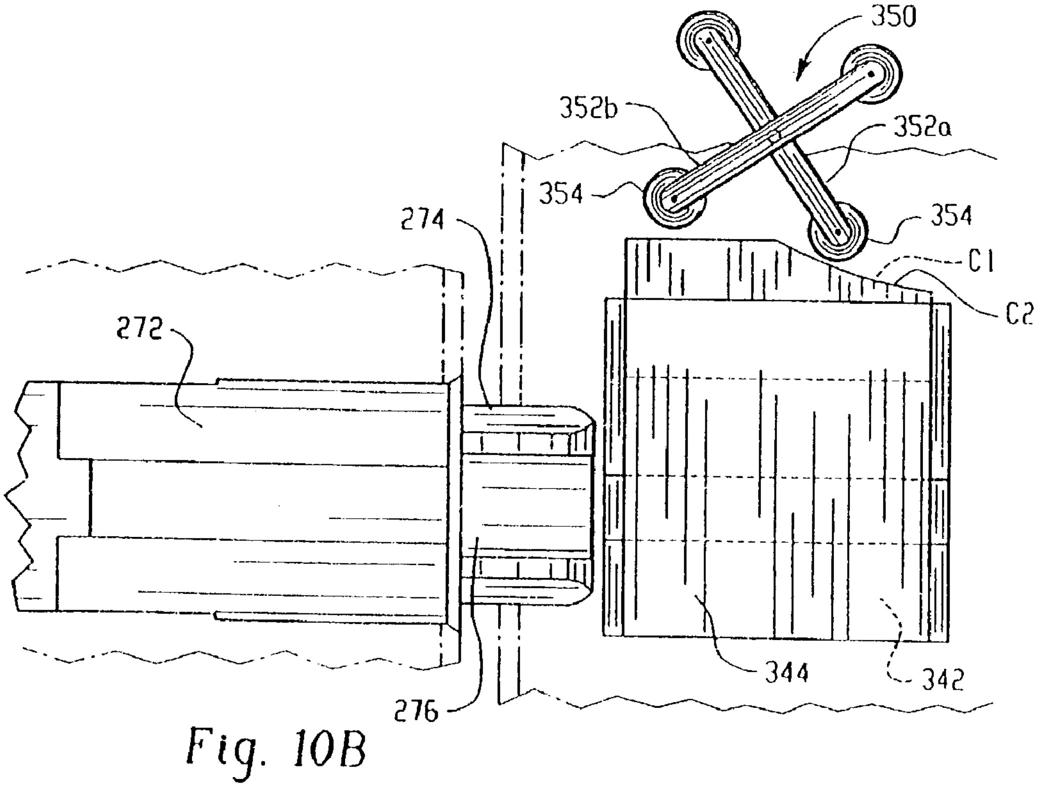
Figure 10C:
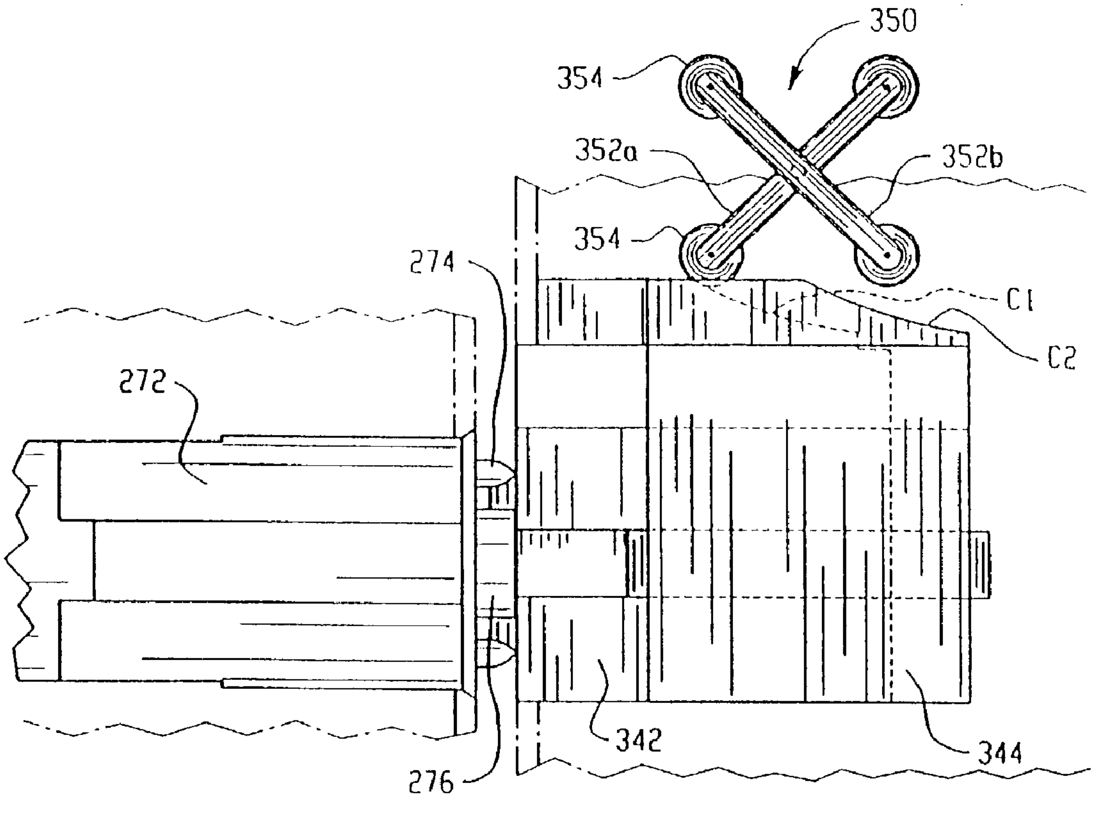

FIG. 10A illustrates slide bolts 342, 344 in a "secured" position, FIG. 10B illustrates slide bolts 342, 344 in an "intermediate" position, while FIG. 10C illustrates slide bolt 342, 344 in an "unsecured" position. In the secured position slide bolt 344 engages and compresses dead latch bolt 276, while slide bolt 342 is disengaged from spring latch bolt 274. Slide bolt 344 is moved to engage dead latch bolt 276 by cam arm 352*b* engaging with cam portion C2. When activated to an unsecured position, cam member 350 rotates such that cam arm 352*b* releases cam portion C2. Accordingly, slide bolt 344 retracts (i.e., moves away from housing 272) due to the force applied by deadbolt latch 276 and/or the force applied by a bias member attached to slide bolt 344, such as the spring described above. The intermediate position is shown in FIG. 10B, wherein both slide bolt 342 and 344 are retracted. In this position neither cam portion C1 nor C2 is engaged with a cam arm. When the unsecured position is reached, slide bolt 342 engages and compresses both spring latch bolt 274 and dead latch bolt 276 (FIG. 10C). In this regard, cam member 350 continues to rotate such that cam arm 352*a* engages with cam portion C1. It should be understood that as cam member 350 is further rotated in the clockwise direction, slide block 342 will be released, thus returning to an intermediate position. Next, cam portion C2 of slide block 344 will be engaged by cam arm 352*b*, as the next cycle commences.

As indicated above, the present invention has numerous advantages over the prior art. In this respect, the components of the present invention which are mounted in a door, door jamb/frame, center frame post, or the like, have a very slim profile (e.g., 1¼ inches wide and 2 inches deep). The slim line width design, enables the present invention to fit in areas, such as the inside of a standard steel or wood double hung door (FIG. 4C), in the center frame post of a door assembly that has a side light glass unit (FIG. 4B), or in the narrow door jamb/frame section between the inner door stop and the edge of the door casing (FIG. 4A). The slim line depth design allows the invention to be hidden behind any 2¼ inch or larger door casing trim, thus eliminating any interior trim or wall damage. The width of a standard door can vary from 1¾ inches to 2¼ inches. This variation in door widths effects the location of the door's strike plate and faceplate. However, this offset will not affect the installation or operation of the present invention. This is due to the dimensions of the present invention. These dimensions allow the present invention to be offset to the required centering point that corresponds to the existing door width.

Another advantage of the present invention is enhanced security. Since the present invention can be concealed in the core of a door, center post, or jamb/frame, it is very secure and tamper resistant. When the present invention is installed, only the strike plate 58 or inner faceplates 106, 88 or 58' are visible when the door is open. In addition, one of the reed switches of the present invention can be wired into an alarm system. When the alarm system is activated/armed and the door is opened, the magnetic reed switch designated as the door alarm switch, will trigger/set off the alarm.

The present invention can be hardwired or battery operated with the easy slide-on battery unit 100. This battery attachment is designed to slide on to the bottom of housing 32 with no internal or external wiring needed. The batteries are easily accessed from the front of battery housing 102 by two separate removable cover plates 104 and 106 located below strike plate 58.

The first and second slide bolts 42, 44 are unique in the way they are used to operate any standard spring latch bolt assembly. As described above, to unsecure a standard latch bolt assembly including a spring latch and/or dead latch bolt, second slide bolt 44 is moved towards the rear of housing 32, thus releasing the door's dead latch bolt 276. As second slide bolt 44 moves back into housing 32, first slide bolt 42 simultaneously moves from the rear of housing 32 to the front of housing 32. This movement compresses the spring latch bolt 274 and/or dead latch bolt 276, at the same time, back into the doors, thus unsecuring the door so that it can be merely pushed open (see FIGS. 3A–3F).

It should be appreciated that one important concept embodied by the dual sliding bolt assembly 40 is the timing of gear set 46, first slide bolt 42 and second slide bolt 44. In particular it is noted that first slide bolt 42 and second slide bolt 44 are offset (e.g., by one inch), thus allowing second slide bolt 44 to release the door's dead latch bolt 276 just before first slide bolt 42 starts to compress both the door's spring latch bolt 274 and the dead latch bolt 276 into the door. When the door's spring latch bolt 274 and the dead latch bolt 276 are fully compressed into the door, the door can be opened. Suitably, this complete operation is accomplished with a few moments (e.g., one second) while delivering a rated load greater than 100 oz./inches.

Another unique feature of the dual sliding bolt assembly 40 is its reversibility. The same first and second slide bolts 42, 44 can operate a right hand door handle set or a left hand door handle set, without having to flip housing 32 upside down. First and second slide bolts 42, 44 are quickly and easily removed from the front of housing 32 and installed in the flipped reverse order. This is possible because both of the slid bolts 42, 44 are designed to be symmetrical on each of their ends and their teeth portions are equally centered in relationship to gear set 46. Since slide bolts 42, 44 can be installed in the flipped reverse order and housing 32 is not rotated, it enables the present invention to be aligned with existing door hardware and can accomplish multiple functions, as elaborated above.

Another significant feature of the present invention is the slim inline, slide-on deadbolt assembly 70. Deadbolt assembly 70 is operated off of the power and control signals of primary assembly 30. In this regard, deadbolt assembly 70 uses the same permanently wired building electrical power supply or the battery power supply of battery unit 100. Moreover, housing 72 is conveniently slid on to the top of housing 32. Deadbolt assembly 70 is installed as a one-piece unit in the core of a door, door jamb/frame, center frame post, or the like. Deadbolt assembly 70 is tamper resistant due to the complete assembly being concealed as described herein.

The present invention also provides a very convenient system to operate. As discussed above, deadbolt assembly 70 is moved to a "locked" position by the touch of the lock button on the operator's RF key chain transmitter T2 or by entering the access code on the wall mounted RF combination keypad transmitter T1. When bolt 74 is extended out, in the locked position and the operator wants to unlock the door from the interior or exterior of the building, all the operator needs to do is to push the unlock button on the RF key chain transmitter T2 or punch in the access code on the wall mounted RF combination keypad transmitter T1. Accordingly, in one procedure, two devices can be operated at the same time. Both the primary door handle set and the motorized deadbolt 74 will retract within moments (e.g., one second) thus, allowing the operator to open the previously locked door.

Another unique aspect of the present invention is the manual key, automatic lock and unlock feature. By utilizing the deadbolt receiving assembly 140, the ability to manually lock and unlock a deadbolt is maintained and enhanced, as discussed above.

The preferred length of housing 32 to the center location of first and second slide bolts 42, 44 is important to the present invention's compatibility with existing one piece deadbolt and handle sets that have 5½ inch offsets. When housing 32 is installed in a door, center frame post, or in the narrow door jamb/frame section, between the inner door stop and the edge of the door casing, it is dimensioned such that housing 32 will not interfere with any existing door mounted keyed deadbolt faceplates. When housing 72 is installed on the top of housing 32, the center line of bolt 74 to the center line of slide bolts 42, 44 is approximately 5½ inches. This 5½ inch offset allows deadbolt assembly 70 to operate with, or without, any existing door mounted deadbolt assemblies or with any one-piece deadbolt and handle sets.

Slip gear cam clutches 50 and 80 are respectively a part of gear sets 46 and 76. Each slip gear cam clutch 50, 80 is used to prevent the respective gear set 46, 76 from binding or being damaged if first and second slide bolt 42, 44, bolt 74 or the gear sets 46, 76 are bound, and the clutch exceeds its maximum torque rating. This binding condition can occur if the door is not closed completely and the operator sends the signal to move the bolt 74 to a locked position. In this situation, bolt 74 can wedge into the door, when mounted in the door jamb/frame, or bolt 74 can wedge into the trim/casing when the assembly is mounted/installed in the door. The cam end of each slip gear cam clutch 50, 80 are located on the output side of each assembly and are used to operate several switches/contacts that are mounted on electronic boards 380, 382 and are used to limit the travel of first and second slide bolts 42, 44, bolt 74 and deadbolt block 64.

Each cam needs to be located on the output side of each assembly, because of the cam position, in relationship to first and second slide bolts 42, 44, deadbolt block 64 and bolt 74. If the input side/motor side of slip gear cam clutch 50, 80 slips and rotates to a random position, the slipping motion will not effect the output side of the slip gear cam clutch's cam position in relationship to first and second slide bolts 42, 44 and deadbolt bolts 74. This is due to the fact that the output side of slip gear cam clutch 50, 80 will not rotate when the input side of slip gear cam clutch 50, 80 exceeds its maximum rated torque and slips/rotates.

If only a remotely activated motorized dead bolt is required, the dual sliding bolt assembly 40 can easily be removed from the front of housing 32 and a one-piece deadbolt block 64 or deadbolt block assembly 64' can be installed (see, e.g., FIG. 2). This one-piece deadbolt block 64 or deadbolt block assembly 64' will protrude (e.g., ¾ of an inch) past the face of housing 32 when in the locked/extended position. This design allows the same housing 32, electronic control circuit, and gear set arrangement to remain unchanged. However, the operation of the primary lock assembly 30 will change from a device that operates a standard latch bolt assembly to a compact stand alone remotely-operated motorized deadbolt, that also has the same tamper resistance described above.

It should be appreciated that the present invention utilizes several miniature magnetic reed switches to enable operation during certain situations. For example, when the door is open the magnetic reed switches will change states due to the fact that a magnetic pick up mounted in the edge of the door or door jamb/frame, which is determined by the location of the invention, is not in alignment with the miniature reed switches located in the front of housing 32, right behind strike plate 58 or 58'. This change in the miniature reed switches state, which is the door open state, will automatically reset the dual sliding bolt assembly 40 or deadbolt block 64, and will also disable the circuit for motorized deadbolt assembly 70. This prevents the operator from mistakenly extending bolt 74 when the door is open. When the door is closed, the miniature reed switches state is changed, due to the fact that the magnetic pickup is located in front and parallel with the reed switches. The new state of the reed switches, enables bolt 74 to be extended into the locked position, if desired, and allows both the bolt 74 and dual sliding bolt assembly 40 or deadbolt block 64 to simultaneously unlock the door when the operator gives that command as mentioned above. The reed switches also enable the present invention to operate longer on its battery power due to the fact that the reed switches are not operated off of a coil, like a standard relay, but rather a permanent magnet. Another advantage of using reed switches is the fact that one of the reed switches can be tied into an alarm system. When the alarm system is activated/armed and the door is opened, the reed switch designated as the door alarm switch, will trigger/set off the alarm in the building.

Figure 11C:
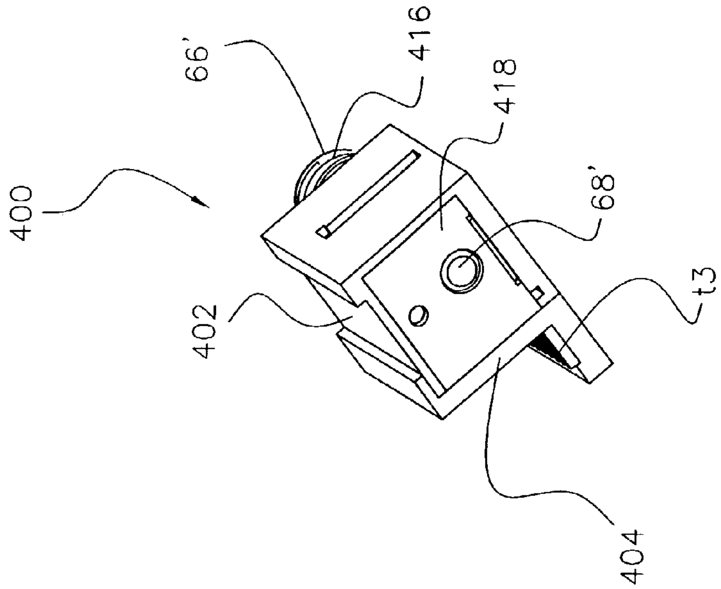
FIGS. 11A, 11B and 11C are various perspective views of an alternate embodiment of a deadbolt block assembly in accordance with aspect of the present invention.
Figure 11B:
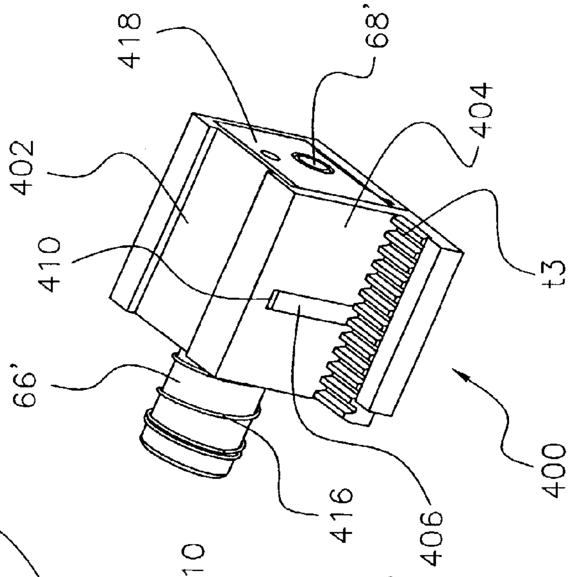
Figure 11A:
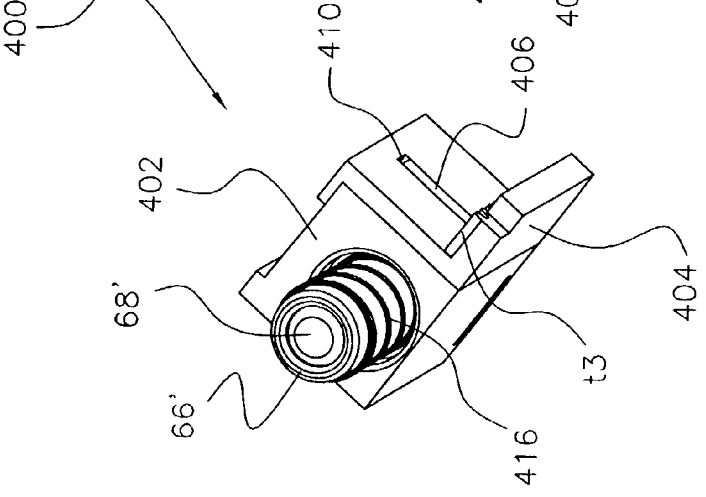

With reference to FIGS. 11A–11C, an alternative embodiment of a deadbolt block assembly 400 will be described. Deadbolt block assembly 400 is similar in many respects to deadbolt block assembly 64', described above, and may be used in the same or similar manner, e.g., as will be appreciate by those of ordinary skill in the art, either as a substitute assembly within the primary assembly 30, within the deadbolt assembly 70 or otherwise. However, the deadbolt block assembly 400 has been divided into two separate body portions 402 and 404. Selectively, the body portions 402 and 404 are disengaged from one another so as to be independently movable or may be mechanically engaged with one another so as to be movable in unison. As shown, the first body portion 402 includes the bolt portion 66' and houses therein a hardened steel plunger rod 68' similar to rod 68, and the second body portion 404 includes toothed portion or rack t3 that engages with an appropriate gear drive. Suitably, the body portions 402 and 404 are arranged to slide linearly along parallel paths between respective extended and retracted positions, either independently or in unison depending upon their state of engagement.

Similar to the deadbolt block assembly 64', the operator may selectively use the deadbolt key manually or use one of the wireless transmitters T1 and/or T2 to electrically lock and unlock the deadbolt block assembly 400 (i.e., to extend and retract the deadbolt block assembly 400 via a driving motor coupled to rack t3 through an appropriate gear set, e.g., gear set 46 or 76). However, should there be a loss of electrical power or an electrical system failure, the deadbolt block assembly 400 is also optionally retracted or unlocked manually/mechanically with the deadbolt key. To accomplish this additional function, the deadbolt block assembly 400 is divided into two body portions 402 and 404. When engaged with one another for movement in unison, the two body portions 402 and 404 are kept from independent movement (i.e., sliding apart) by a spring loaded key bolt 406 that is biased by spring 408 toward and normally received in slot 410. That is to say, the first body portion 402 houses key bolt 406 and the biasing spring 408 that urges the key bolt 406 toward the second body portion 404 such that when aligned with the slot 410 in the second body portion 404 the key bolt 406 is receive in the slot 410 thereby engaging the body portions 402, 404 together for movement in unison with one another.

Figure 12:
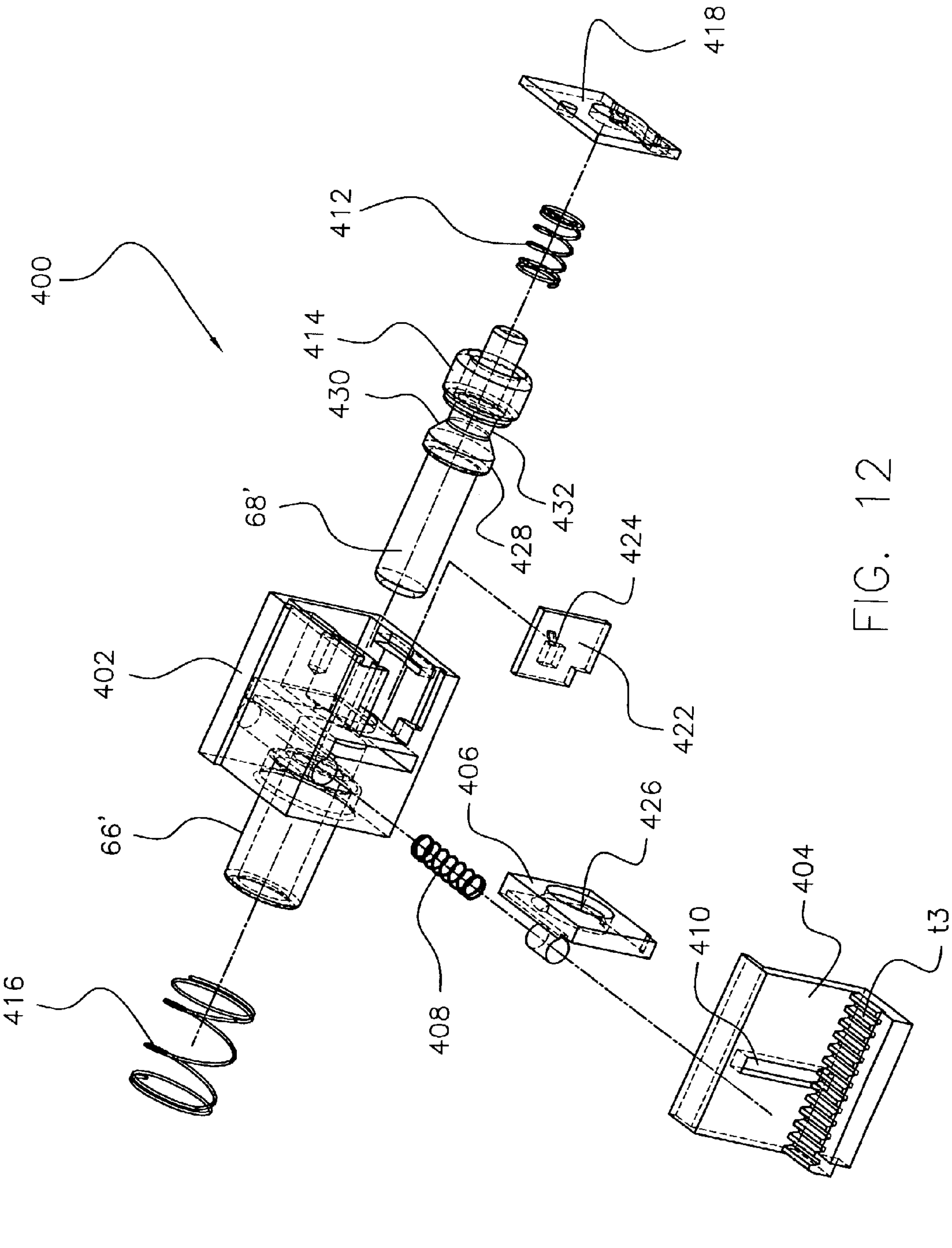
FIG. 12 is an exploded view of the deadbolt block assembly shown in FIGS. 11A, 11B and 11C, wherein dashed lines indicate internal features or elements otherwise obstructed from view.

With additional reference to FIG. 12, other biasing springs include springs 412 and 416. Spring 412 is compressed between a first enlarged diameter spring receiving portion 414 of rod 68' and a rear wall 418 of the first body portion 402 thereby biasing the rod 68' away from the rear wall 418 toward a forward position within the front of the first body portion 402 (see, e.g., FIGS. **13*a* and 13B). Spring 416 encircles the bolt portion 66' and extends between the first body portion 402 and a front wall 420 of the housing (again, see FIGS. 13A and 13B) in which the deadbolt block assembly 400 is arranged. The spring 416 biases the first body portion 402 toward the retracted position (i.e., unlocked position) within the housing containing the deadbolt block assembly 400**.

Figure 14:
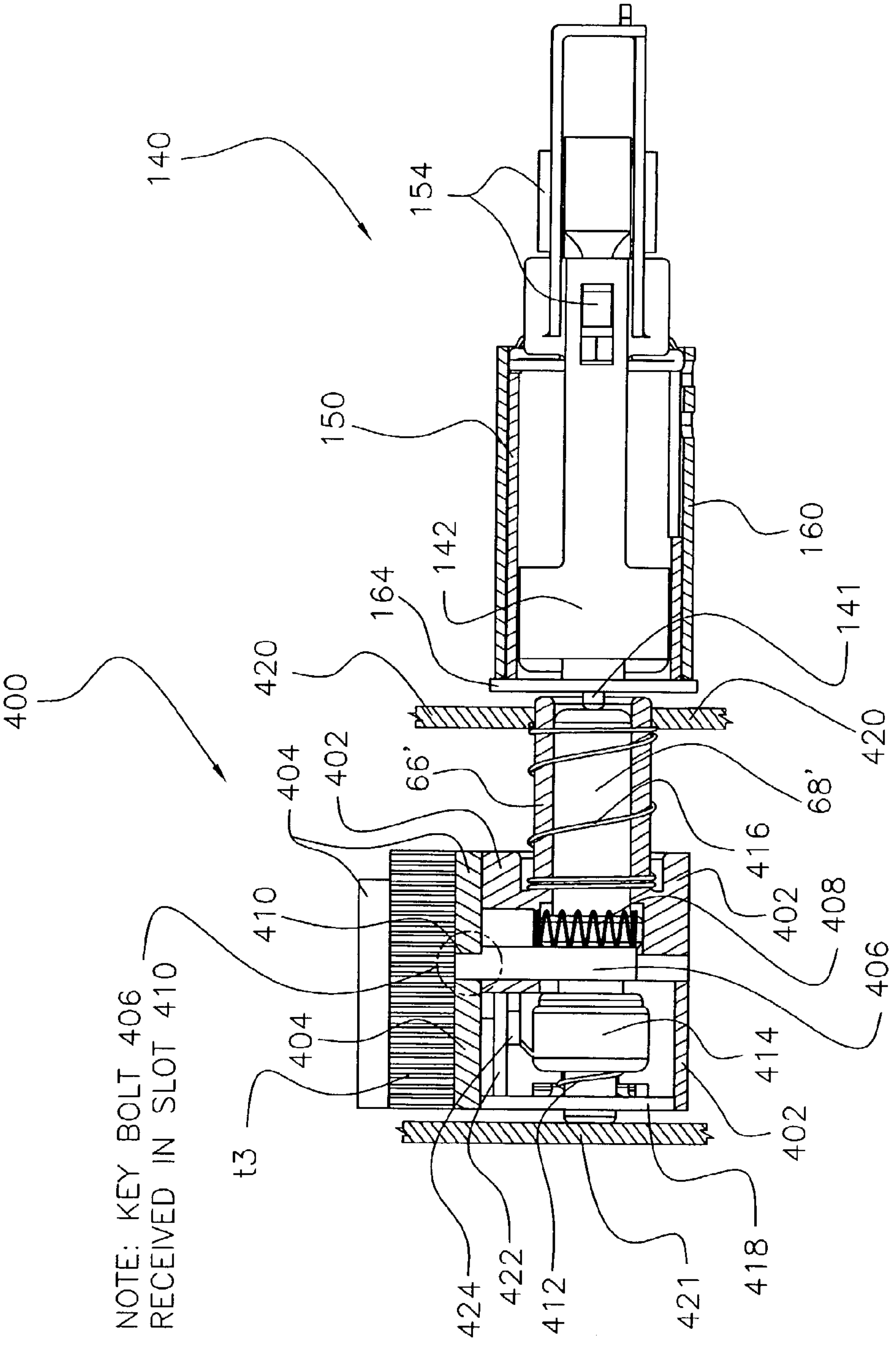
FIG. 14 is a top partial section view showing the deadbolt block assembly of FIGS. 11A, 11B and 11C in an unlocked state and the deadbolt receiving assembly of FIG. 8 being used to manually activate an electrically powered locking operation.

Returning attention to FIG. 12, the first body portion 402 also includes a printed circuit board (PCB) 422 having an electric switch 424 arranged thereon so as to be selective tripped by the enlarged diameter portion 414 of the rod 68' when the rod 68' is pushed sufficiently rearward within the first body portion 402 (see FIG. 14). Note, the rear wall 421 of the housing in which the deadbolt block assembly 400 is contained acts as a stop when the deadbolt block assembly 400 is in the unlocked position thereby blocking the rod 68' from being pushed so far back as to disengaged the first body portion 402 from the second body portion 404, as described in the following. Further, the rod 68' extends through an offset opening 426 within the key bolt 406 and includes an second enlarged diameter portion 428 with a chamfered edge 430 and a narrower diameter portion 432 arranged between the chamfered edge 430 of the second enlarged diameter portion 428 and the first enlarged diameter portion 414.

Figure 13A:
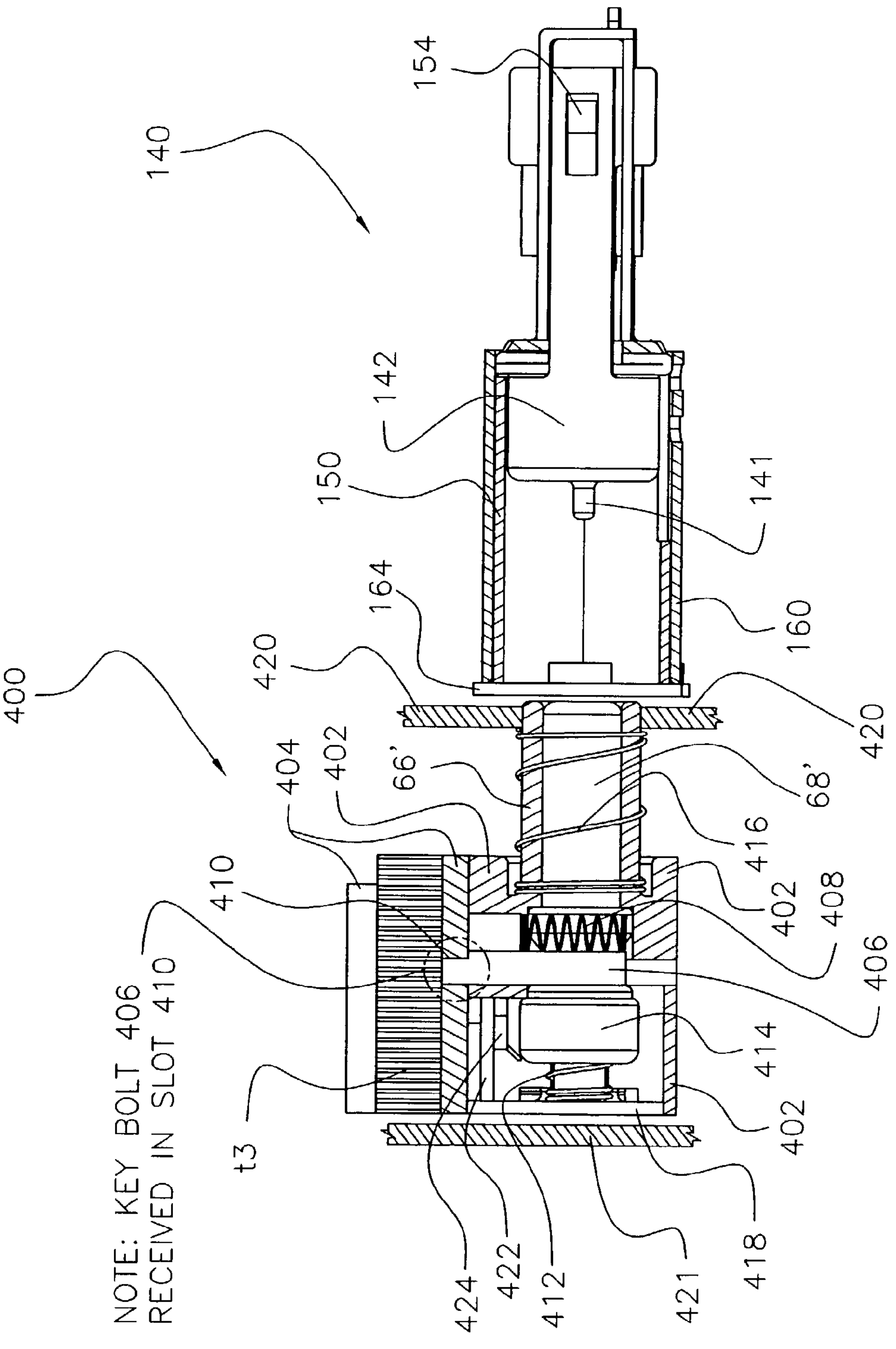
FIGS. 13A and 13B are top and side partial section views showing the deadbolt block assembly of FIGS. 11A, 11B and 11C in an unlocked state and the deadbolt receiving assembly of FIG. 8 in an at rest state.
Figure 16A:
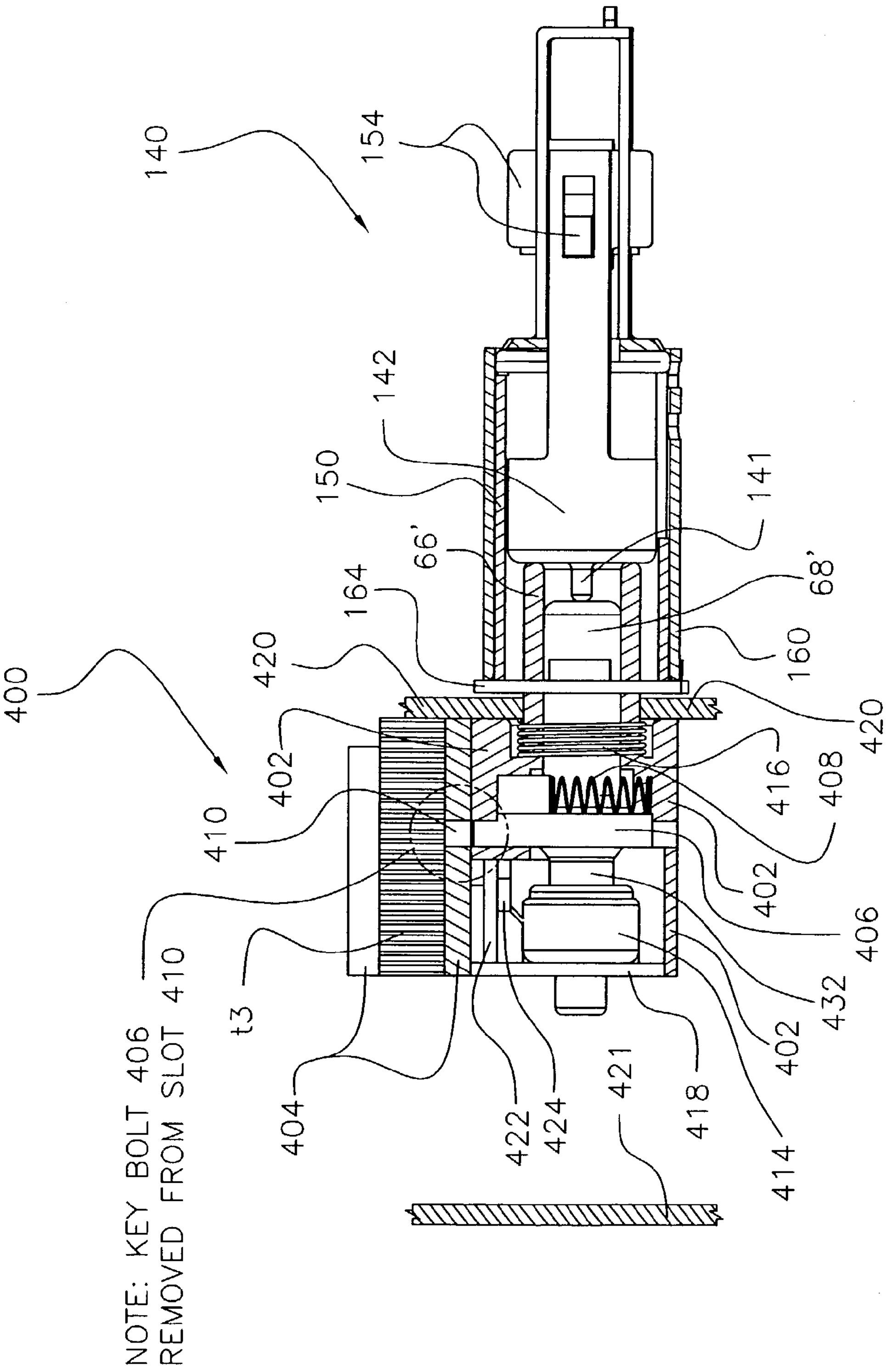
FIGS. 16A, 16B and 16C are top, side and perspective partial section views showing the deadbolt block assembly of FIGS. 11A, 11B and 11C in a locked state and the deadbolt receiving assembly of FIG. 8 being used to manually perform a mechanical (i.e., non-electrically powered) unlocking operation.
Figure 16B:
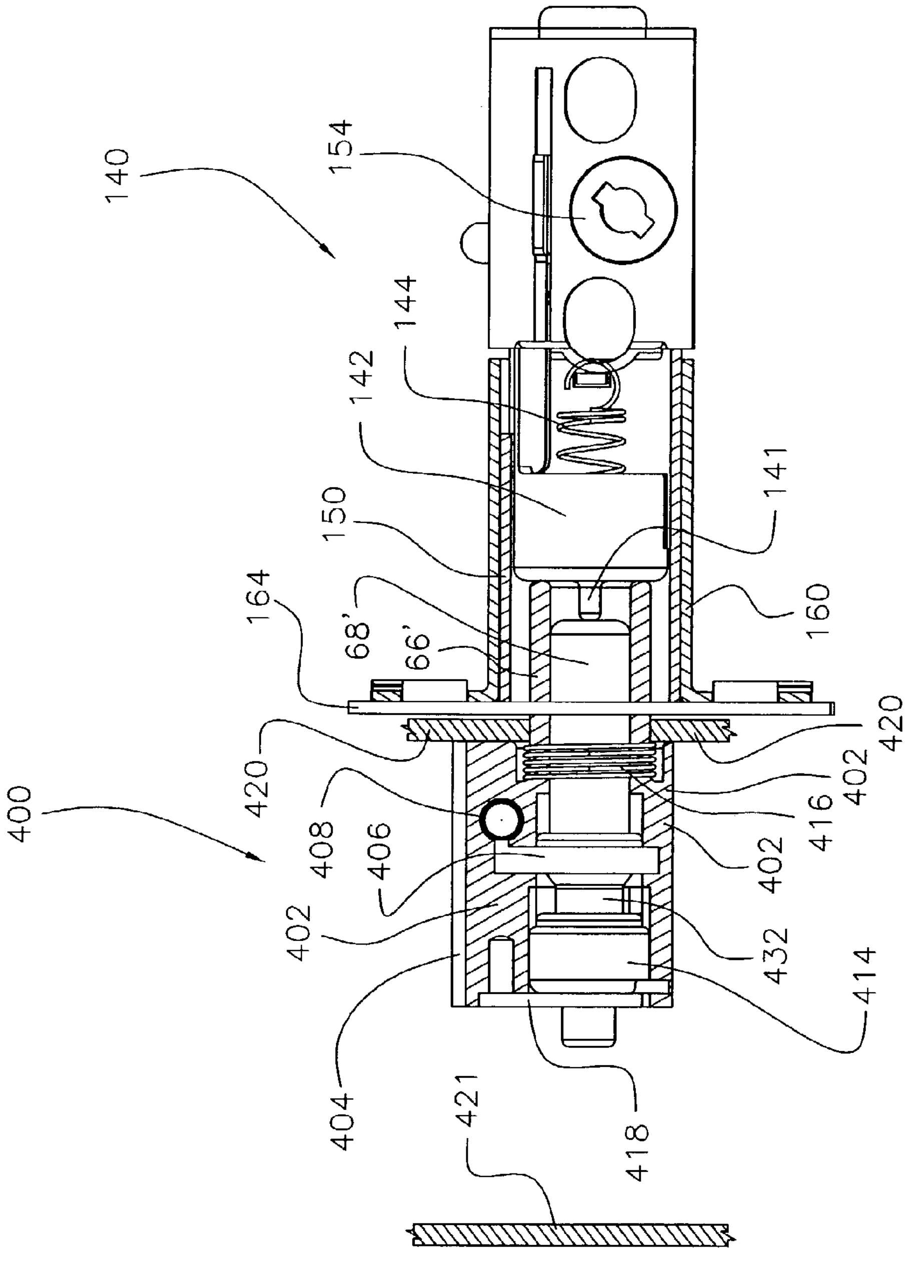
Figure 16C:
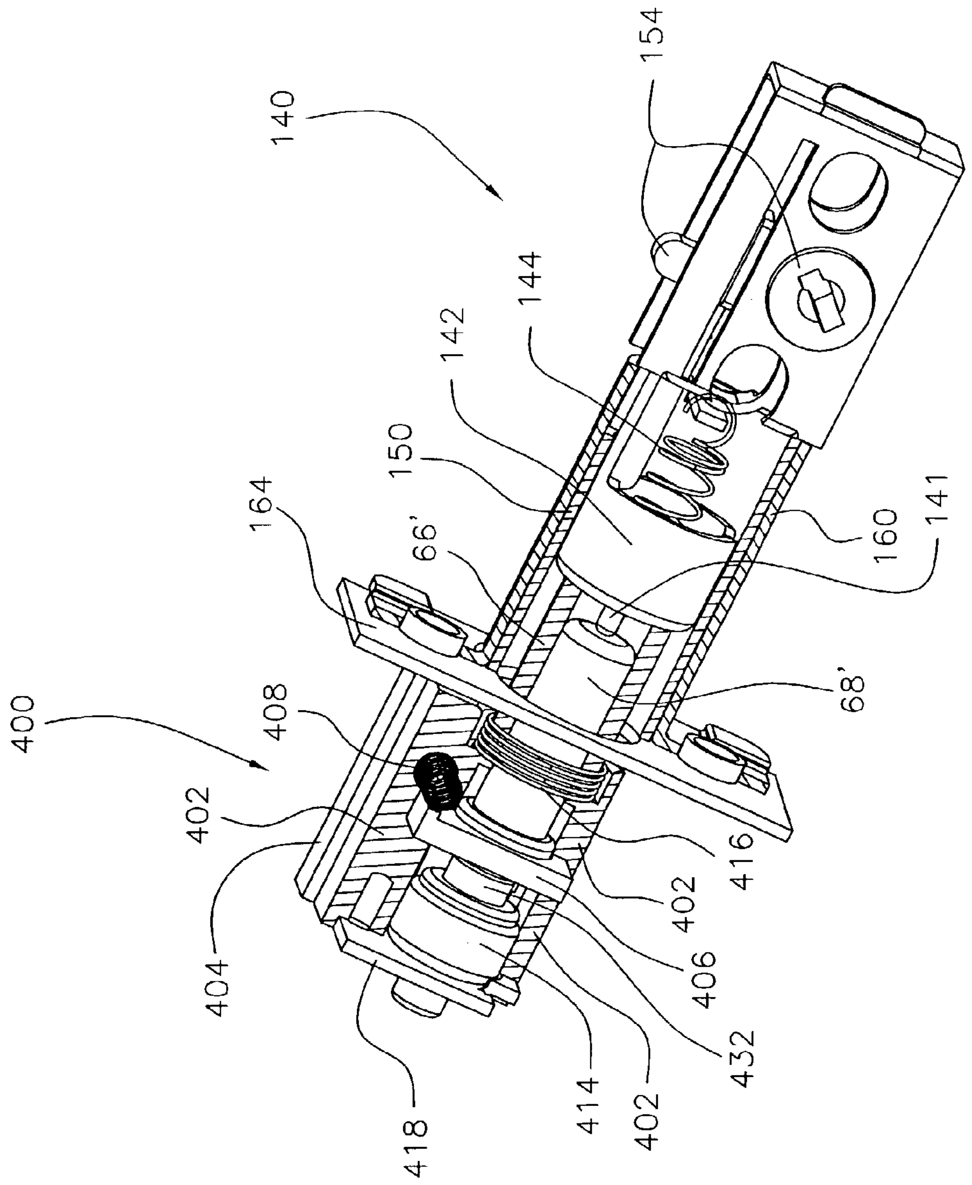

Suitably, during otherwise normal operation (e.g., with no electrical power loss or failure), the offset opening 426 coincides with the narrower diameter portion 432 of the rod 68' and accordingly the key bolt 406 under the influence of the biasing spring 408 is free to be receiving within the slot 410 of the second body portion 404 (see, e.g., FIGS. 13A and 14). In this configuration, the two body portions 402, 404 are mechanically engaged with one another so as to move (i.e., slide linearly back and forth) in unison. However, when the rod 68' is pushed sufficiently rearward within the first body portion 402 (see, e.g., FIGS. 16A and 16C), the offset opening 426 rides up on the chamfered edge 430 of the second enlarged diameter portion 428 of the rod 68' thereby pulling the key bolt 406 from the slot 410 in the second body portion 404 such that the two body portions 402, 404 are mechanically disengaged from one another so as to be free to independently move or slide parallel with respect to one another.

The remotely controlled deadbolt block assembly 400 is easily installed whenever the user or operator wants enhanced security added to the door entry system 2. It can be employed within the primary assembly 30, the deadbolt assembly 70 or a similar stand alone or complementary assembly including like components such as the housing, electronic control circuit, gear train, motor drive, messaging circuit, LED indicators, etc. Further, it is to be appreciated that the deadbolt block assembly 400 is selectively operated via one or both of the transmitters T1 and T2. The deadbolt block assembly 400 works in conjunction with doors fitted with common brands of mechanical deadbolt locks. That is to say, doors fitted with these types of deadbolt locks preferably are retrofitted with the optional deadbolt receiving assembly 140. As indicated previously, the deadbolt receiving assembly 140 replaces some of the original deadbolt lock's hardware (e.g., the deadbolt) while retaining the use of other hardware (e.g., the key cylinder). The deadbolt receiving assembly 140 is unique and easily installs so that the deadbolt block assembly 400 and the deadbolt receiving assembly 140 are arranged opposite one another, e.g., with one in the door and one in door jam/frame (see FIGS. 13A through 17B). Suitably, modifications to the bore in the door used by an original tubular deadbolt are not required. The deadbolt receiving assembly 140 can be installed with a variety of backsets (e.g., a 2⅜" backset thru a 2¾" backset), and can convert the majority of mechanical deadbolt locks into assemblies that accept and retain the deadbolt block assembly's bolt portion 66' in order to prevent the door from being opened (see, e.g., FIG. 15). Alternately, of course, the deadbolt receiving assembly 140 may come complete with its own key cylinder for new installations or where no prior deadbolt lock existed.

Figure 15:
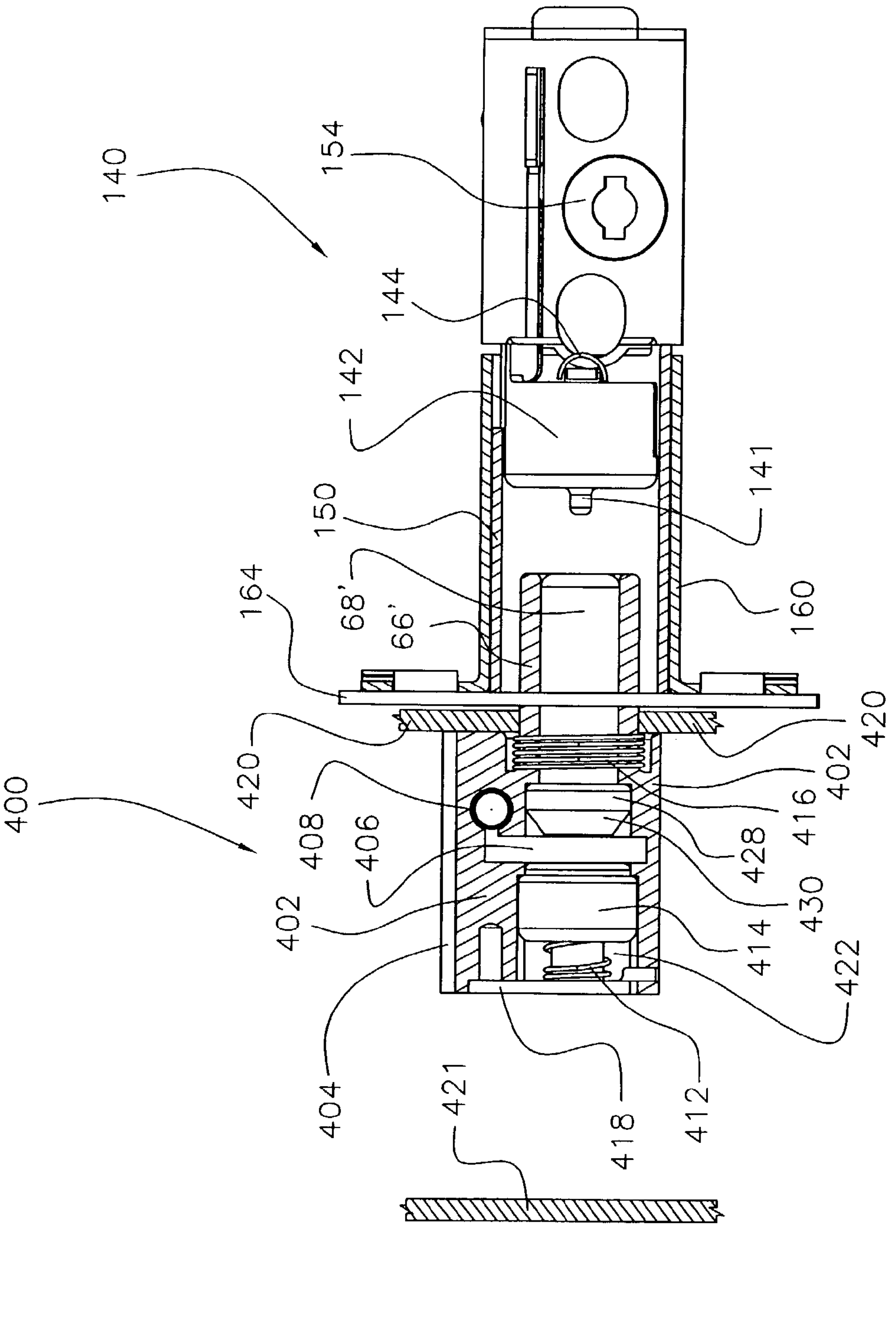
FIG. 15 is a side partial section view showing the deadbolt block assembly of FIGS. 11A, 11B and 11C in a locked state and the deadbolt receiving assembly of FIG. 8 in an at rest state.

While the deadbolt block assembly 400 may be selectively used to remotely lock or unlock a door via wireless transmitters T1 and/or T2, with the deadbolt receiving assembly 140 installed, the operator also has the added option to be able to use the deadbolt's key to manually lock or unlock the deadbolt block assembly 400 electronically by activating a motor drive with the switch 424 mounted on the PCB 422 located towards the rear of the first body portion 402. Additionally, if there is loss of electrical power or an electrical system failure or it is otherwise so desired, the operator also has the option to manually and mechanically unlock an otherwise locked deadbolt block assembly 400 (as shown in FIG. 15) by disengaging the first body portion 402 from second body portion 404, i.e., by using the protuberance 141 on the forward bolt section 142 of the bolt receiving assembly 140 to push the rod 68' sufficiently rearward within the first body portion 402 such that the key bolt 406 is pulled, via the second enlarged diameter portion 428 of the rod 68', from the slot 410 in the second body portion 404 (see FIGS. 16A–16C). Once the first body portion 402 is disengaged from the second body portion 404, the spring 416 is free to push the first body portion 402 away from the front wall 420 so as to retract the bolt portion 66' from the deadbolt receiving assembly 140 thereby unlocking the deadbolt block assembly 400 while the second body portion 404 remains in an extended position under the influence of the gear train coupled to rack t3 (see FIGS. 17A and 17B).

Exemplary operation of the deadbolt block assembly 400 will now be described by way of reference to FIGS. 13A–17B. The operations described include electronically locking and unlocking the deadbolt block assembly 400 with remote transmitters T1 and/or T2, electronically locking and unlocking the deadbolt block assembly 400 manually with a deadbolt key, and mechanically unlocking the deadbolt block assembly 400 manually with the deadbolt key.

A first option allows the operator to electronically lock and unlock the deadbolt block assembly 400 with remote transmitters T1 and/or T2.

Figure 13B:
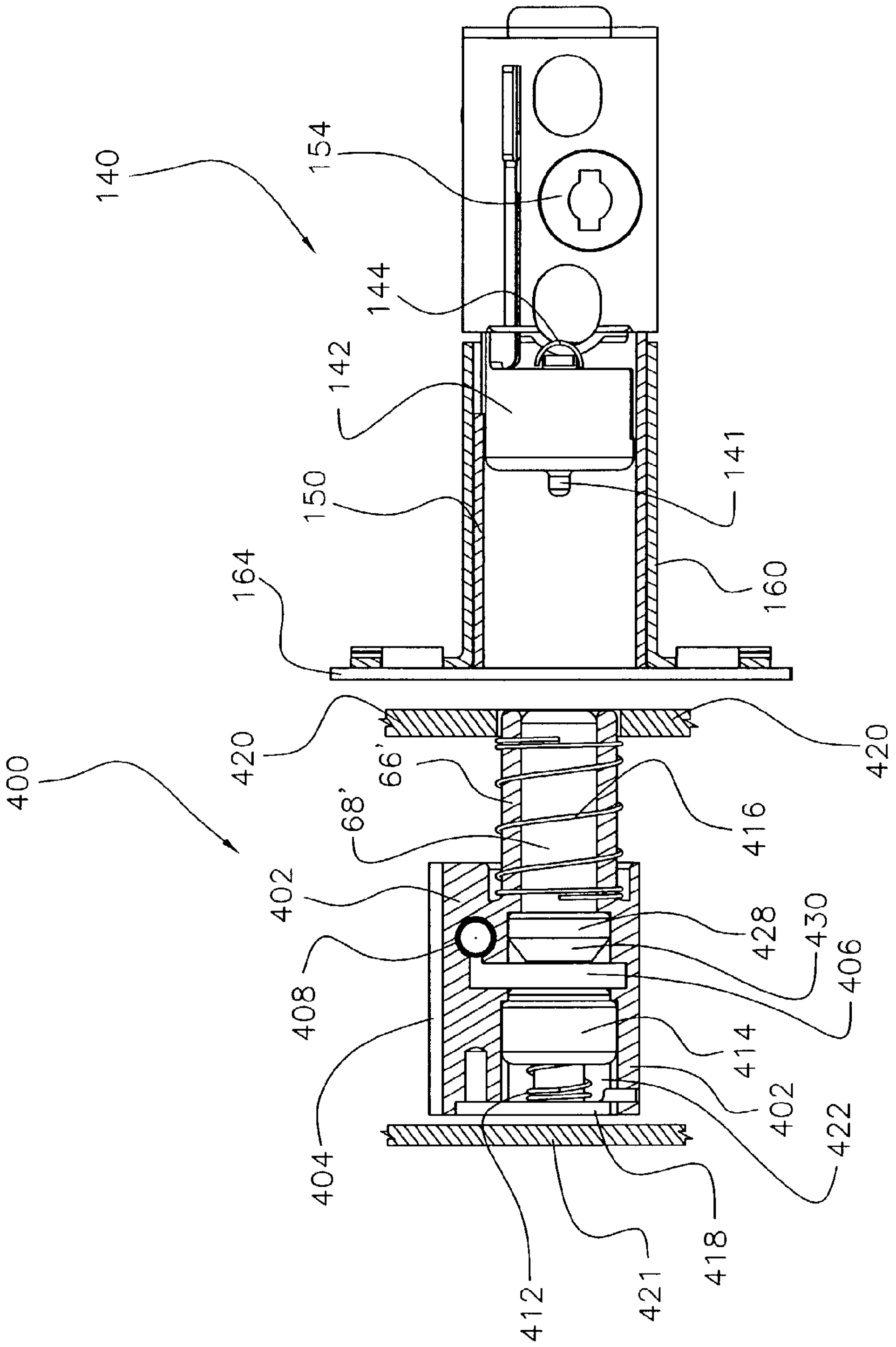

Assuming an initial unlocked position as shown in FIGS. 13A and 13B, to remotely lock the deadbolt block assembly 400, the user appropriately activates the transmitter T1 or T2, e.g., by pressing the appropriate button or combination of buttons, which may optionally include a custom programmable button, a series of buttons corresponding to a lock code, a button marked with a locked symbol, or the like. Suitably, this activates both the transmitter's control circuitry and optionally messaging circuitry. For example, in response to this signal, an optional messaging system may say "door locking" and the appropriate LED lights up, indicating that the door is being locked. During this function, if in use, the dual sliding bolt assembly 40 optionally remains in the secured position or the reset state (see, e.g., FIGS. 3A and 3D). When a valid locking command signal from the transmitter T1, T2 is received and decoded, an appropriate motor drive circuit for the deadbolt block assembly 400 is activated thereby causing an electric motor (e.g., a 9 volt DC motor) to be powered and rotate the gear train engaging rack t3. The rotating gear train causes the deadbolt block assembly 400 (with mechanically engaged first and second body portions 402 and 404) to advance towards the front wall 420 of the housing until the bolt portion 66' is fully extended into the deadbolt receiving assembly 140, as shown in FIG. 15. This prevents the door from being opened. Suitably, this function takes less than 2 seconds. Optionally then, when the deadbolt is locked in this manner, the messaging system is activated after a 2 second delay. For example, an operator waiting by the door would hear "deadbolt locked" and observe a red LED light up.

Assuming an initial locked position as shown in FIG. 15, to remotely unlock the deadbolt block assembly 400, the user appropriately activates the transmitter T1 or T2, e.g., by pressing the appropriate button or combination of buttons, which may optionally include a custom programmable button, a series of buttons corresponding to an unlock code, a button marked with an unlocked symbol, or the like. Suitably, this activates both the transmitter's control circuitry and optionally messaging circuitry. For example, in response to this signal, an optional messaging system may say "door unlocking" and the appropriate LED lights up, indicating that the door is being unlocked. During this function, if in use, the dual sliding bolt assembly 40 optionally moves to the unsecured position (see, e.g., FIGS. 3C and 3F). When a valid unlocking command signal from the transmitter T1, T2 is received and decoded, the motor drive circuit for the deadbolt block assembly 400 is activated thereby causing the electric motor to be powered and rotate the gear train engaging rack t3. Suitably, the gear train rotates this time in the reverse direction from that used to perform the aforementioned locking operation. The rotating gear train causes the deadbolt block assembly 400 (with mechanically engaged first and second body portions 402 and 404) to advance towards the rear wall 421 of the housing until the bolt portion 66' is fully retracted from the deadbolt receiving assembly 140, as shown in FIGS. 13A and 13B. This allows the door to be opened. Suitably, this function also takes less than 2 seconds. Optionally then, when the deadbolt is unlocked in this manner, the messaging system is activated after a 2 second delay. For example, an operator waiting by the door would hear "deadbolt unlocked" and observe a green LED light up.

It is to be appreciated that suitably, if used in conjunction, both the deadbolt block assembly 400 and dual sliding bolt assembly 40 function simultaneously when under electronic control. For example, when the deadbolt assembly 400 is locking the door, the dual sliding bolt assembly 40 remains in its secure state (see FIGS. 3A and 3D), and when the deadbolt block assembly 400 is unlocking the door, the dual sliding bolt assembly 40 moves to its unsecured state (see FIGS. 3C and 3F) thereby unlatching the door's handle hardware so that the door can be merely pushed open regardless of whether the door handle is lock or not. That is to say, two different functions are executed by just activating once either the locking or unlocking functions on the wireless transmitters T1, T2.

A second option allows the operator to electronically lock and unlock the deadbolt block assembly 400 manually with a deadbolt key.

Assuming an initial unlocked position as shown in FIGS. 13A and 13B, to manually lock the deadbolt block assembly 400 using the system's electrical power, the user inserts the deadbolt key into the deadbolt's key cylinder and temporarily turns it, e.g., approximately a quarter of a turn, until the protuberance 141 on the forward bolt section 142 of the bolt receiving assembly 140 pushes in the rod 68' a distance, e.g., of approximately ⅛ of an inch, which will in turn cause the first enlarged diameter portion 414 of the rod 68' to trip the switch 424 (see FIG. 14). Suitably, the rod 68' can only be pushed in ⅛ of an inch when the deadbolt block assembly 400 is in position shown in FIG. 14. That is to say, the rod 68' is designed with a rear stud that is normally flush to the outer face of the rear wall 418 of the first body portion 402. Therefore, when the rod 68' is not depressed it will be flush to the outer face of this rear wall 418. However, when it is depressed, it will hit the rear wall 421 of the housing which acts as a stop, thereby allowing the rod 68' enough rearward motion to activate the switch 424 but not enough to permit the rod 68' to be move so far back as to release the key bolt 406 from the slot 410.

In any event, tripping the switch 424 activates electrically powered locking of the deadbolt block assembly 400 in the same manner as if the transmitters T1 and/or T2 were used remotely as described above. Note, that after temporarily turning the key forward to activate the switch 424, the user will then release it and/or turn it backward for removal from the key cylinder, thereby allowing the forward bolt section 142 to retreat into the bolt receiving assembly 140 under the influence of spring 144 so as to make room therein for the advancing bolt portion 66' of the deadbolt block assembly 400. Optionally, after activation of the switch 424, there may be a slight delay before the deadbolt block assembly 400 is advanced to allow time for the forward bolt section 142 to be retracted into the bolt receiving assembly 140.

Assuming an initial locked position as shown in FIG. 15, to manually unlock the deadbolt block assembly 400 using the system's electrical power, the user inserts the deadbolt key into the deadbolt's key cylinder and again temporarily turns it, e.g., approximately a quarter of a turn, until the protuberance 141 on the forward bolt section 142 of the bolt receiving assembly 140 pushes in the rod 68' a distance, e.g., of approximately ⅛ of an inch, which will in turn cause the first enlarged diameter portion 414 of the rod 68' to again trip the switch 424. Suitably, in this instance, the rod 68' is not pushed back enough to cause the release of the key bolt 406 from the slot 410. This point is recognized by the increased resistance that is realized from the spring 408 biasing the key bolt 406 in opposition to the second enlarged diameter portion 428 of the rod 68' pulling the key bold 406 from the slot 410.

In any event, tripping the switch 424 this time activates electrically powered unlocking of the deadbolt block assembly 400 in the same manner as if the transmitters T1 and/or T2 were used remotely as described above. Note, that after temporarily turning the key forward to activate the switch 424, the user will then release it and/or turn it backward for removal from the key cylinder, thereby allowing the forward bolt section 142 to retreat into the bolt receiving assembly 140 under the influence of spring 144 so as to achieve the unlocked state shown in FIGS. 13A and 13B. Suitably, upon tripping the switch 424 in this instance, electrically powered unlocking of the deadbolt block assembly 400 is immediately implemented, i.e., no time delay has to be imposed prior thereto since the forward bolt section 142 does not have to have time to be moved out of the way in the same manner as with the manually activated electrically powered locking operation.

A third option allows the operator to mechanically (i.e., using no electrical power) unlock the deadbolt block assembly 400 manually with the deadbolt key.

Assuming an initial locked position as shown in FIG. 15, to manually unlock the deadbolt block assembly 400 without using the system's electrical power, the user inserts the deadbolt key into the deadbolt's key cylinder and again temporarily turns it, e.g., approximately a half of a turn, until the protuberance 141 on the forward bolt section 142 of the bolt receiving assembly 140 pushes in the rod 68' a distance, e.g., of approximately ¼ of an inch, which will in turn first cause the first enlarged diameter portion 414 of the rod 68' to again trip the switch 424. However, since there is no electrical power (presumably from an electrical failure or other electrical power loss), tripping the switch 424 in this instance will have no effect. Suitably, in this case, the rod 68' continues to be pushed back enough to cause the second enlarged diameter portion 428 of the rod 68' to pull the key bolt 406 from the slot 410 (see FIGS. 16A–16C). That is to say, since the rod 68' has moved back a sufficient distance, it will cause the key bolt 406 to be released from the slot 410 thereby mechanically disengaging the two body portions 402, 404 from one another so that they are free to independently move or slide parallel with respect to one another. It is to be appreciated that the rod 68' includes the second enlarged diameter portion 428 with the chamfered cylindrical edge 430 that when forced against the offset opening 426 of the key bolt 406, will cause the key bolt 406 (otherwise coincident with the narrower portion 432 of the rod 68') to shift over and be pulled from slot 410.

Figure 17A:
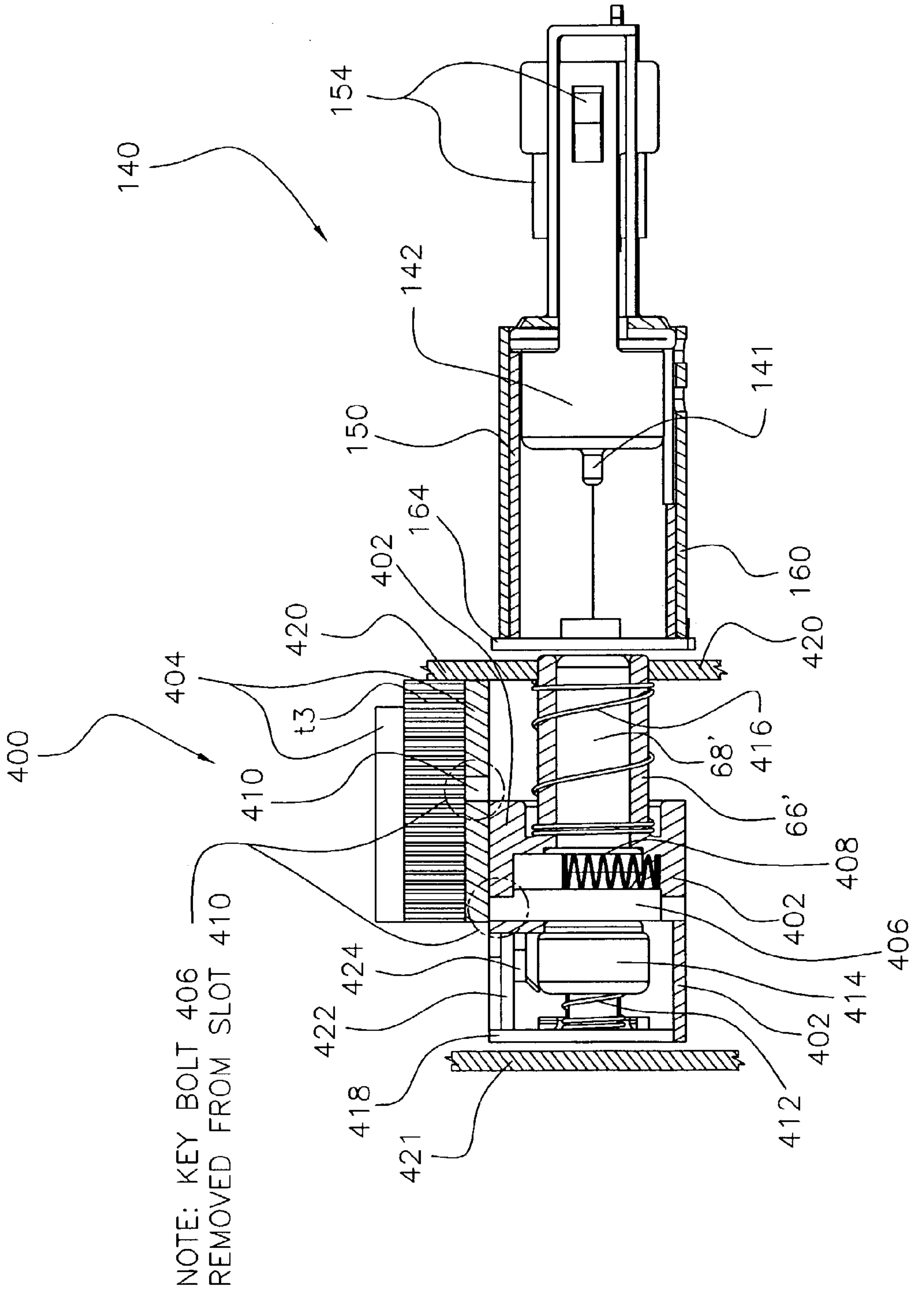
FIGS. 17A and 17B are top and perspective partial section views showing: the deadbolt block assembly of FIGS. 11A, 11B and 11C, in an unlocked state after a mechanical unlocking operation; and, the deadbolt receiving assembly of FIG. 8, in an at rest state.
Figure 17B:
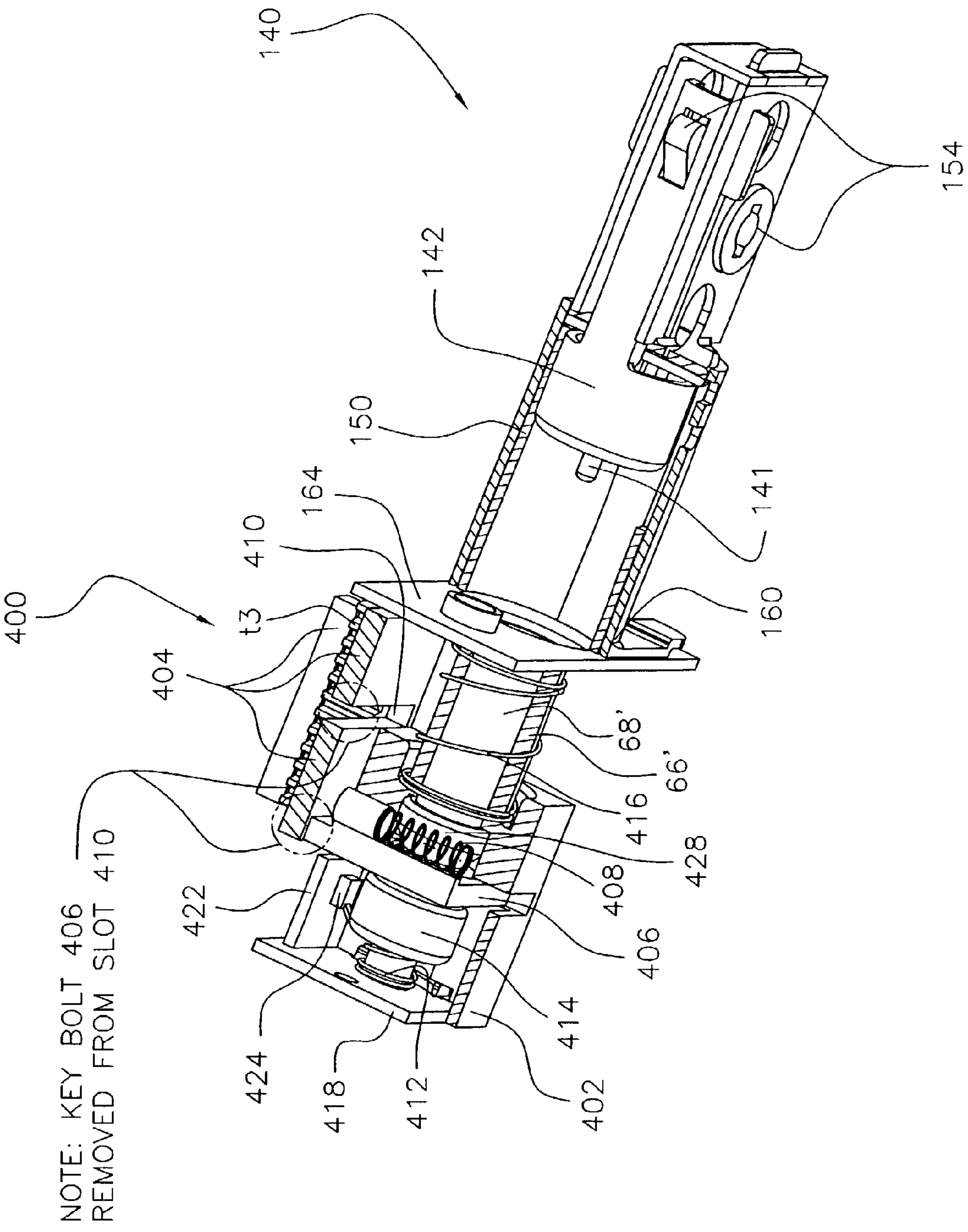

Once the two body portions 402, 404 are mechanically disengaged from one another, the compressed spring 416 will force the released first body portion 402 and all of its internal components to immediately retract from the deadbolt receiving assembly 140 and as the first body portion 402 moves back the rod 68' is pushed back into its forward at rest position within the first body portion 402 by the spring 412. Accordingly, the deadbolt block assembly 400 achieves the unlocked state as shown in FIGS. 17A and 17B. Note, the second body portion 404 remains forward under the influence of the gear train engaged with rack t3 insomuch as the electric motor was not utilized in the unlocking operation.

Optionally, if due to a friction or jamming, the spring 416 does not have enough force to push back the first body portion 402, then the forward bolt section 142 of the bolt receiving assembly 140 can be used to more forcibly push back the first body portion 402 and remove the bolt portion 66' from the deadbolt receiving assembly 140 by manually turning the key in the key cylinder farther, e.g., a full turn. This operation unlocks the deadbolt block assembly 400 allowing the door to be opened and suitably takes less than 2 seconds. When the user removes the key from the key cylinder, the deadbolt receiving assembly 140 returns to its at rest position as shown in FIGS. 17A and 17B under the influence of the spring 144.

After electrical power has been restored, the user optionally activated an electronic unlocking operation, e.g., via transmitters T1, T2. Accordingly, the second body portion 404 that was left forward is retracted under the power of the electric motor which turns the gear train engaged with rack t3. When fully retracted so that the slot 410 again aligns with key bolt 406, the key bolt 406 is pushed into the slot 410 under the biasing force of the spring 408 thereby achieving the state shown in FIGS. 13A and 13B and mechanically re-engaging the two body portions 402, 404 together for movement in unison with one another. The deadbolt block assembly 400 is in this manner reset.

Figure 18:
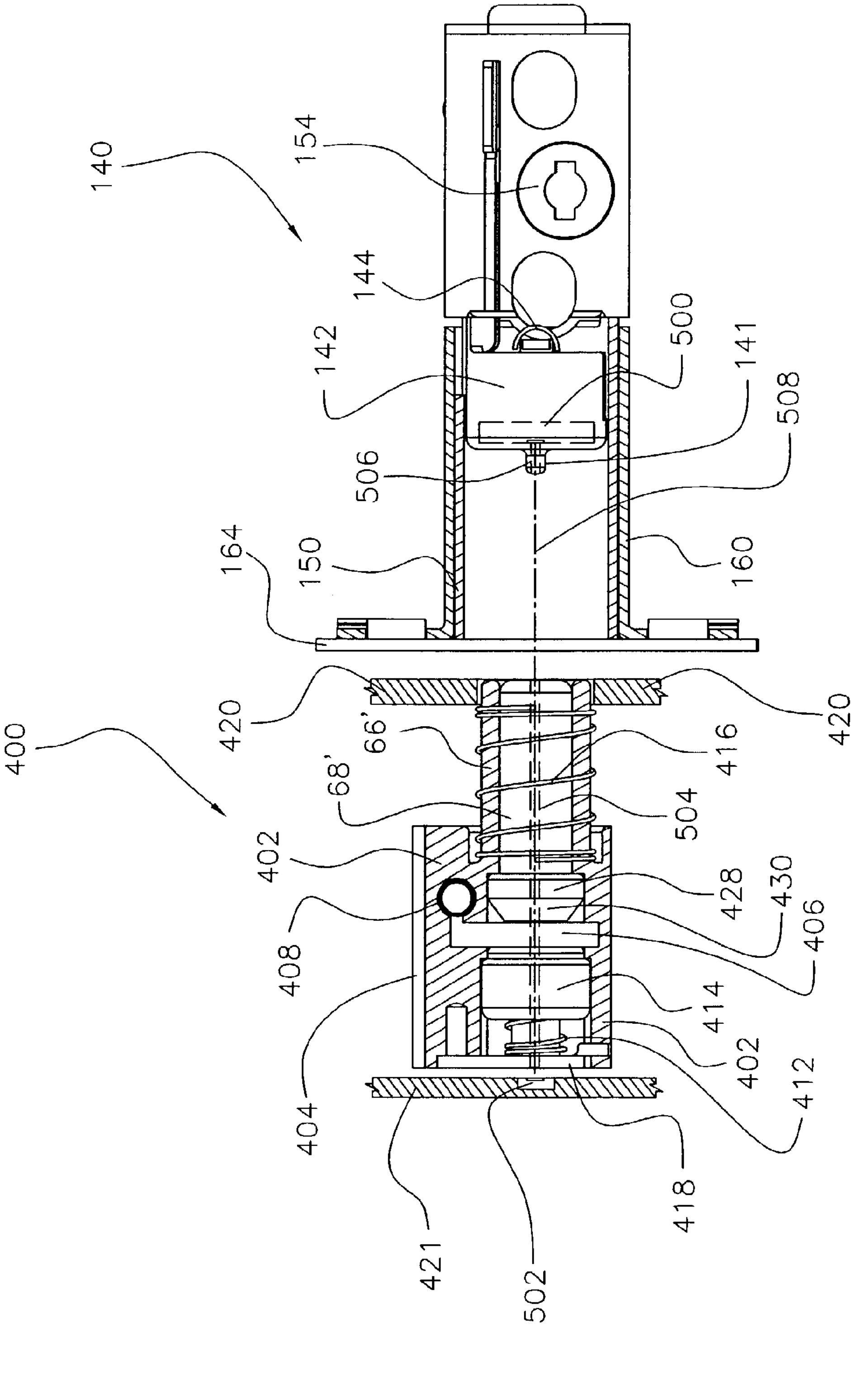
FIG. 18 is a side partial section views showing a deadbolt block assembly in an unlocked state and a deadbolt receiving assembly in an at rest state, in accordance with aspect of an alternate embodiment of the present invention.

FIG. 18 illustrates an alternate embodiment of the deadbolt block assembly 400 shown in FIGS. 11A–17B. For clarity, convenience and simplicity, like reference numbers are use to refer to like parts. Essentially, operation of the deadbolt block assembly 400 remains the same as previously described. However, rather than having mechanical tripping of the switch 424 (i.e., manually employing the deadbolt's original key cylinder to cause the protuberance 141 on the forward bolt section 142 of the bolt receiving assembly 140 to push in the rod 68' and trip the switch 424) as appropriate to selectively trigger electrically powered locking and/or unlocking operations as described, the configuration of FIG. 18 is equipped with a transmitter 500 and a receiver 502, suitable infrared, so that the electrically powered locking and/or unlocking operations are triggered by optical signaling. As shown, the transmitter 500 is equipped in the forward bolt section 142 and the receiver 502 is arranged in the rear wall 421. Central longitudinal bores 504 and 506 in the rod 68' and forward bolt section 142, respectively, are aligned and/or arranged so as to place the transmitter 500 and receiver 502 in optical communication with one another. When activated, the transmitter 500 transmits a beam of light 508 that is received by the receiver 502 thereby triggering the electrically powered locking and/or unlocking operations described. Optionally, the bores 504 and/or 506 are equipped with fiberoptics or the like to facilitate optical transmission of the beam 508 along their respective lengths and/or to facilitate optical coupling therebetween. Suitably, the transmitter 500 is selectively activated by turning the original deadbolt key cylinder. For example, a mechanical switch may be arranged within the bolt receiving assembly 140 such that when the deadbolt's key cylinder is turned the switch activates the transmitter 500. When the beam of light 508 is detected by the receiver 502, the electrically powered locking or unlock operation as the case may be is triggered depending upon the current state of the deadbolt assembly 400 at the time.

While FIGS. 11–18 and the corresponding text reference the block assembly 400 being driven via toothed portion or rack t3, it is to be appreciated that alternately other suitable power driving arrangements may be employed, e.g., a rack t3 may be replaced by a cam follower that is driven by a cam arm, i.e., an arrangement similar to the one described with reference to FIGS. 10A–10C may be employed, or some other appropriate drive linkage may be substituted.

Suitably, the rod 68' is made of 17-4 PH stainless steel, heat-treated to a hardness of over 50 Rockwell C-scale. Due to its cylindrical shape, this rod 68' is also free to spin in the first body portion 402. The cylindrical shape permits the rod 68' to be moved linearly along its axis while being rotated without effecting the operation of it or other internal components contained within the first body portion 402. Further, using the hardened material along with the rod's cylindrical shape inhibits effective cutting-in-half or drilling attempts aimed at defeating the deadbolt block assembly 400.

The invention has been described with reference to preferred embodiments. Obviously, modifications and alterations will occur to others upon a reading and understanding of this specification. It is intended that all such modifications and alterations be included insofar as they come within the scope of the appended claims or the equivalents thereof.

What is claimed is:

1. A door entry system comprising:

control means for controlling operation of the door entry system; and, a deadbolt assembly that is operable to selectively lock a door, said deadbolt assembly including:

a first bolt member movable between an extended position and a retracted position;

a switch mounted to said first bolt member, said switch conveying a signal to the control means to move said first bolt member between the extended and retracted positions when said switch is activated, and driving means for selectively moving the first bolt member between the extended and retracted positions.

2. The door entry system according to claim 1, wherein said system further comprises a deadbolt receiving assembly including a receiving region that receives said first bolt member when the first bolt member is in the extended position thereby locking the door, said deadbolt receiving region not receiving the first bolt member when the first bolt member is in the retracted position thereby not locking the door.

3. A door entry system comprising:

control means for controlling operation of the door entry system;

a deadbolt assembly that is operable to selectively lock a door, said deadbolt assembly including:

a bolt member movable between an extended position and a retracted position;

switch means arranged on said bolt member, said switch means conveying a signal to the control means to move said bolt member between the extended and retracted positions when said switch means is activated; and, driving means for selectively moving the bolt member between the extended and retracted positions; and, a deadbolt receiving assembly that selectively receives the bolt member, said deadbolt receiving assembly including:

a receiving region that receives said bolt member when the bolt member is in the extended position, said dead bolt receiving region not receiving the bolt member when the bolt member is in the retracted position; and, a bolt section that is selectively extendable into and retractable from the receiving region, said bolt section being extended to activate said switch means on the bolt member.

4. A door entry system comprising:

control means for controlling operation of the door entry system;

a deadbolt assembly that is operable to selectively lock a door, said deadbolt assembly including:

a first bolt member movable between an extended position and a retracted position;

a switch, said switch conveying a signal to the control means to move said first bolt member between the extended and retracted positions when said switch is activated; and, driving means for selectively moving the first bolt member between the extended and retracted positions; and, a second bolt member that is selectively engaged with and disengaged from the first bolt member such that when engaged the first and second bolt members move in unison with one another and when disengaged the first and second bolt members are independently movable with respect to one another.

5. The door entry system according to claim 4, wherein the driving means is coupled to the second bolt member such that the first bolt member is movable by the driving means between the extended and retracted positions when the second bolt member is engaged with the first bolt member and the first bolt member is not movable by the driving means between the extended and retracted positions when the second bolt member is disengaged from the first bolt member.

6. The door entry system according to claim 5, wherein the first bolt member is biased toward the retracted position.

7. The door entry system according to claim 4, further comprising linking means for selectively engaging and disengaging the first and second bolt members with one another.

8. The door entry system according to claim 7, wherein the linking means comprises:

an opening formed in one of the first and second bolt members; and, a movable key bolt retained by the other of the first and second bolt members, said key bolt being received in said opening to engage the first and second bolt members with one another and said key bolt being removed from said opening to disengage the first and second bolt members from one another.

9. The door entry system according to claim 8, wherein said movable key bolt is biased to be received in said opening.

10. The door entry system according to claim 9, further comprising a rod extending through an opening in said movable key bolt, said rod being movable so as to remove said movable key bolt from said opening.

11. A door entry system comprising:

a deadbolt assembly that is operable to selectively lock a door, said deadbolt assembly including first and second members that are selectively engaged with and disengaged from one another such that when engaged they move in unison with one another and when disengaged they are independently movable with respect to one another;

drive means coupled to the second member such that the first member is selectively movable by the drive means between extended and retracted positions when the first and second members are engaged with one another and the first member is not movable by the drive means between the extended and retracted positions when the first and second members are disengaged from one another; and, control means for controlling the drive means.

12. The door entry system according to claim 11, wherein said system further comprises a deadbolt receiving assembly including a receiving region that receives said first member when the first member is in the extended position thereby locking the door, said deadbolt receiving region not receiving the first member when the first member is in the retracted position thereby not locking the door.

13. A door entry system comprising:

a deadbolt assembly that is operable to selectively lock a door, said deadbolt assembly including first and second members that are selectively engaged with and disengaged from one another such that when engaged they move in unison with one another and when disengaged they are independently movable with respect to one another;

drive means coupled to the second member such that the first member is selectively movable by the drive means between extended and retracted positions when the first and second members are engaged with one another;

control means for controlling the drive means;

a deadbolt receiving assembly including a receiving region that receives said first member when the first member is in the extended position, said deadbolt receiving region not receiving the first member when the first member is in the retracted position; and, a bolt section that is selectively extendable into and retractable from the receiving region, said bolt section being extended to disengage the first member from the second member.

14. The door entry system according to claim 13, wherein the first bolt member is biased toward the retracted position.

15. The door entry system according to claim 13, further comprising:

a switch that is activated by manual operation of the bolt section, said switch conveying a signal to the control means to control the drive means.

16. The door entry system according to claim 15, wherein the switch is arranged on the first member.

17. The door entry system according to claim 13, further comprising linking means for selectively engaging and disengaging the first and second members with one another.

18. The door entry system according to claim 17, wherein the linking means comprises:

a opening formed in one of the first and second members; and, a movable key bolt retained by the other of the first and second members, said key bolt being received in said opening to engage the first and second members with one another and said key bolt being removed from said opening to disengage the first and second members from one another.

19. The door entry system according to claim 18, wherein said movable key bolt is biased to be received in said opening.

20. The door entry system according to claim 19, further comprising a rod extending through an opening in said movable key bolt, said rod being movable so as to remove said movable key bolt from said opening.

21. The door entry system according to claim 20, wherein the rod is moved so as to remove said movable key bolt from said opening by extending the bolt section of the deadbolt receiving assembly.

22. The door entry system according to claim 11, further comprising:

a remote transmitter that is selectively operated to send a signal to the control means to control the drive means.

23. A door entry system comprising:

a deadbolt member movable between an extended and a retracted position;

switch means arranged in or on the deadbolt member, said switch means generating a signal to effect movement of said deadbolt member to the extended or retracted position when said switch means is activated;

motor means for moving the dead bolt member between the extended and retracted positions;

a deadbolt bolt lever body housing means dimensioned to receive said deadbolt member when in its extended position, said deadbolt bolt lever body housing means including therein a second movable bolt section engagable with said switch means to activate said switch means.

24. A door entry system comprising:

control means for controlling operation of the door entry system;

a deadbolt assembly that is operable to selectively lock a door, said deadbolt assembly including:

a bolt member movable between an extended position and a retracted position;

trigger means mounted to the bolt member, said trigger means conveying a signal to the control means to move said bolt member between the extended and retracted positions when said trigger means is triggered; and, driving means for selectively moving the bolt member between the extended and retracted positions; and, a deadbolt receiving assembly arranged opposite the deadbolt assembly, said deadbolt receiving assembly including:

a receiving region that receives said bolt member when the bolt member is in the extended position thereby locking the door, said deadbolt receiving region not receiving the bolt member when the bolt member is in the retracted position thereby not locking the door; and, activation means for selectively triggering the trigger means.

25. A door entry system of comprising:

control means for controlling operation of the door entry system;

a deadbolt assembly that is operable to selectively lock a door, said deadbolt assembly including:

a bolt member movable between an extended position and a retracted position;

trigger means for conveying a signal to the control means to move said bolt member between the extended and retracted positions when said trigger means is triggered; and, driving means for selectively moving the bolt member between the extended and retracted positions; and, a deadbolt receiving assembly arranged opposite the deadbolt assembly, said deadbolt receiving assembly including:

a receiving region that receives said bolt member when the bolt member is in the extended position, said deadbolt receiving region not receiving the bolt member when the bolt member is in the retracted position; and, activation means for selectively triggering the trigger means;

wherein the trigger means comprises a switch arranged on the bolt member such that the triggering means is triggered upon tripping the switch, and the activation means comprises a bolt section that is selectively extendable into and retractable from the receiving region, said bolt section being extended to cause tripping of the switch arranged on the bolt member.

26. A door entry system comprising:

control means for controlling operation of the door entry system;

a deadbolt assembly that is operable to selectively lock a door, said deadbolt assembly including:

a bolt member movable between an extended position and a retracted position;

trigger means for conveying a signal to the control means to move said bolt member between the extended and retracted positions when said trigger means is triggered; and, driving means for selectively moving the bolt member between the extended and retracted positions; and, a deadbolt receiving assembly arranged opposite the deadbolt assembly, said deadbolt receiving assembly including:

a receiving region that receives said bolt member when the bolt member is in the extended position, said receiving region not receiving the bolt member when the bolt member is in the retracted position; and, activation means for selectively triggering the trigger means;

wherein the triggering means comprises a receiver and the activation means comprises a transmitter that selectively generates a transmission upon activation, said receiver causing triggering of the trigger means upon receipt of the transmission from the transmitter.

27. The door entry system of claim 26, wherein the receiver is an infrared detector that detects infrared light incident thereon and the transmitter is an infrared transmitter that selectively generates a beam of infrared light upon activation, said infrared detector and transmitter being in optical communication with one another along an optical path.

28. The door entry system of claim 27, wherein the optical path extends through at least one of the bolt member and the receiving region.

* * * * *